United States Patent
Jiang et al.

(10) Patent No.: US 11,598,919 B2
(45) Date of Patent: Mar. 7, 2023

(54) ARTIFICIAL REALITY SYSTEM HAVING BRAGG GRATING

(71) Applicant: Meta Platforms Technologies, LLC, Menlo Park, CA (US)

(72) Inventors: Yingfei Jiang, Redmond, WA (US); Lu Lu, Kirkland, WA (US); Hao Yu, Kent, OH (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 134 days.

(21) Appl. No.: 17/063,190

(22) Filed: Oct. 5, 2020

(65) Prior Publication Data
US 2021/0109285 A1    Apr. 15, 2021

Related U.S. Application Data

(60) Provisional application No. 62/914,673, filed on Oct. 14, 2019.

(51) Int. Cl.
| | | |
|---|---|---|
| *G02B 6/293* | (2006.01) | |
| *G02B 27/01* | (2006.01) | |
| *F21V 8/00* | (2006.01) | |

(52) U.S. Cl.
CPC ..... *G02B 6/29323* (2013.01); *G02B 6/29325* (2013.01); *G02B 27/0172* (2013.01); *G02B 6/0011* (2013.01)

(58) Field of Classification Search
CPC .............. G02B 6/0011; G02B 6/29323; G02B 6/29325; G02B 27/0172
See application file for complete search history.

(56) References Cited

U.S. PATENT DOCUMENTS

| | | | | |
|---|---|---|---|---|
| 7,453,612 | B2 * | 11/2008 | Mukawa ............ | G02B 27/0081 359/34 |
| 10,095,045 | B2 * | 10/2018 | Robbins ............. | G02B 27/4261 |
| 2014/0140653 | A1 * | 5/2014 | Brown ................. | G02B 6/0033 385/10 |
| 2015/0125109 | A1 * | 5/2015 | Robbins ............. | G02B 27/0172 385/10 |

FOREIGN PATENT DOCUMENTS

| | | | | | |
|---|---|---|---|---|---|
| CN | | 109917547 A | * | 6/2019 | ............. G02B 27/01 |
| CN | | 110320667 A | * | 10/2019 | ......... G02B 27/0103 |
| WO | WO-2019067100 A1 | | * | 4/2019 | ......... G02B 27/0172 |

OTHER PUBLICATIONS

Zhang et al., "Improved holographic waveguide display system," Applied Optics, vol. 54, Issue 12, Apr. 2015, 5 pp.

(Continued)

*Primary Examiner* — Daniel Petkovsek
(74) *Attorney, Agent, or Firm* — Shumaker & Sieffert, P.A.

(57) ABSTRACT

An optical assembly may include a waveguide and a Bragg grating configured to couple light into or out of the waveguide. The Bragg grating may include a plurality of layer pairs, wherein at least one layer pair comprises a first material having a first refractive index and a second layer having a second refractive index, and wherein properties of the Bragg grating are selected so that the Bragg grating exhibits a substantially similar diffractive efficiency and diffraction angle for light of at least two colors.

18 Claims, 18 Drawing Sheets

(56) References Cited

OTHER PUBLICATIONS

Guo et al., "Design of a multiplexing grating for color holographic waveguide," Optical Engineering, vol. 54, No. 12, Dec. 2015, 10 pp.
Mukawa et al., "A full-color eyewear display using planar waveguides with reflection volume holograms," Journal of the Society for Information Display (SID), vol. 17, No. 3, Jan. 2009, 9 pp.
International Search Report and Written Opinion from International Application No. PCT/US2020/055442, dated Feb. 8, 2021, 12 pp.
International Preliminary Report on Patentability for International Application No. PCT/US2020/055442, dated Apr. 28, 2022, 11 pages.

* cited by examiner

ARTIFICIAL REALITY SYSTEM HAVING BRAGG GRATING

This application claims the benefit of U.S. Provisional Patent Application No. 62/914,673 filed on Oct. 14, 2019, which is hereby incorporated by reference herein in its entirety.

TECHNICAL FIELD

The disclosure generally relates to artificial reality systems, such as augmented reality and/or mixed reality systems.

BACKGROUND

Artificial reality systems have applications in many fields such as computer gaming, health and safety, industry, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Artificial reality systems often use a head mounted display (HMD) to present images to a user. For the user to comfortably view the images displayed by the HMD, an optical system is used to shape light and direct it to the user's eye. Because the user wears the HMD on their head, size and weight are important considerations. Additionally, reducing or eliminating image artifacts or distortion is important for enabling a comfortable viewing experience.

SUMMARY

In general, the disclosure describes artificial reality systems and, more specifically, artificial reality systems that include an optical assembly including at least one Bragg grating for coupling light into and/or out of a waveguide. For example, Bragg gratings are described having properties selected so that the Bragg gratings have similar diffractive efficiencies and diffraction angles for a plurality of different wavelengths of light. For example, the Bragg gratings described herein may be specifically configured to exhibit similar diffractive efficiencies and diffraction angles for wavelengths of light corresponding to the green, red, and blue regions within the spectrum. The Bragg gratings may be reflective or transmissive Bragg gratings. This may allow a reduced number of waveguides (e.g., a single waveguide) to be used as optical elements within an artificial reality system for controlling and outputting green, red, and blue light, thus reducing size and/or weight of the artificial reality system and/or reducing complexity of alignment and assembly of the artificial reality system.

In one or more example aspects, the application describes an optical assembly that includes a waveguide; and a Bragg grating configured to couple light into or out of the waveguide, wherein the Bragg grating comprises a plurality of layer pairs, wherein at least one layer pair comprises a first material having a first refractive index and a second layer having a second refractive index, and wherein properties of the Bragg grating are selected so that the Bragg grating exhibits a substantially similar diffractive efficiency and diffraction angle for light of at least two colors.

In one or more example aspects, the application describes a head mounted display that includes a projector; and an optical assembly. The optical assembly includes a waveguide; and a Bragg grating configured to couple light into or out of the waveguide, wherein the Bragg grating comprises a plurality of layer pairs, wherein a layer pair comprises a first material having a first refractive index and a second layer having a second refractive index, wherein properties of the Bragg grating are selected so that the Bragg grating exhibits a substantially similar diffractive efficiency and diffraction angle for light of at least two colors, and wherein the projector is configured to direct light into the waveguide.

In one or more example aspects, the application describes a method that includes determining properties of a Bragg grating so that the Bragg grating exhibits a substantially similar diffractive efficiency and diffraction angle for light of at least two colors, wherein the Bragg grating is configured to couple light into or out of a waveguide, wherein the Bragg grating comprises a plurality of layer pairs, wherein a layer pair comprises a first material having a first refractive index and a second layer having a second refractive index; and assembling the Bragg grating with a waveguide.

The details of one or more examples are set forth in the accompanying drawings and the description below. Other features, objects, and advantages will be apparent from the description and drawings, and from the claims.

DETAILED DESCRIPTION

Figure 1:
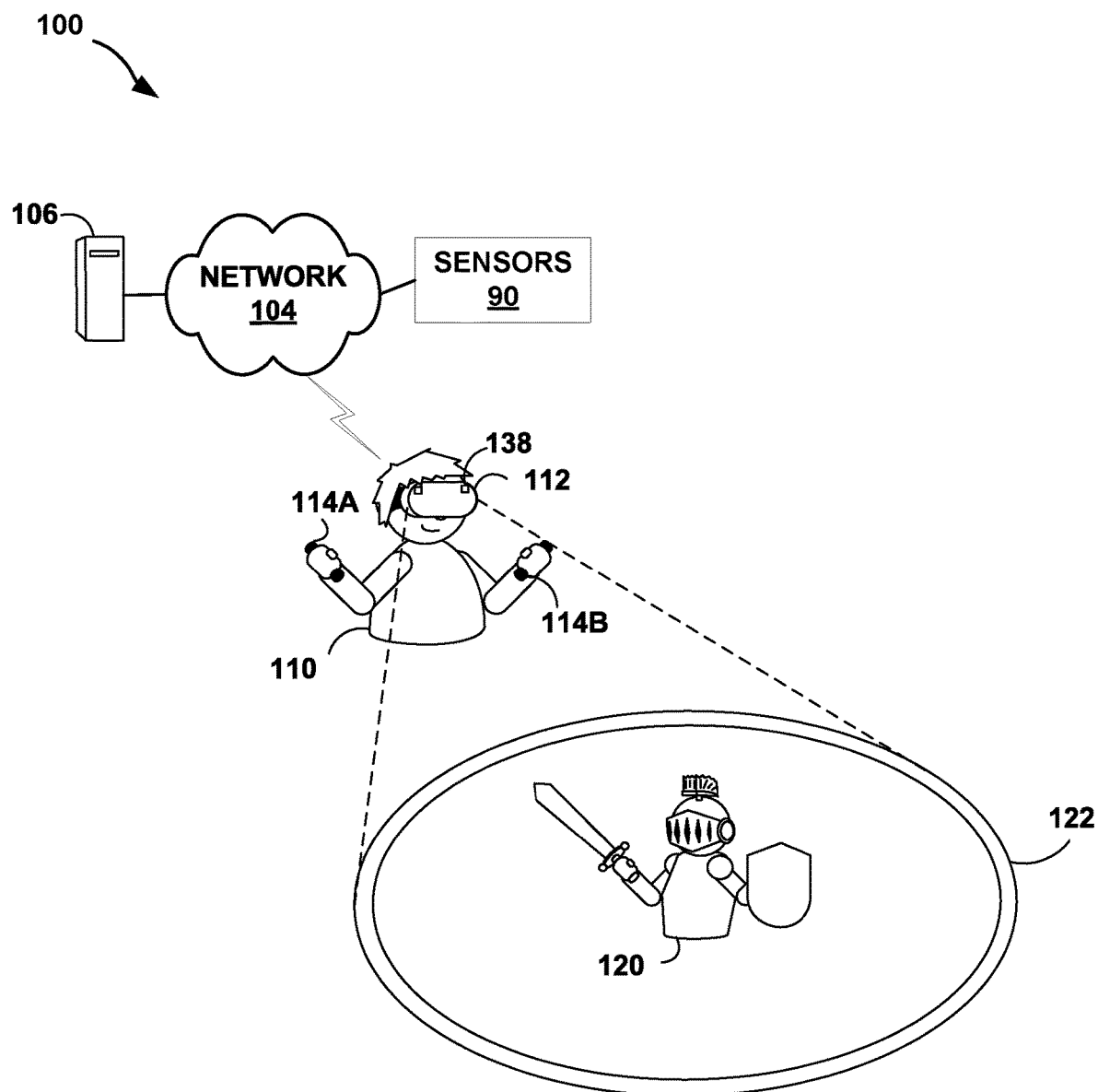
FIG. 1 is an illustration depicting an example artificial reality system that includes at least one Bragg grating for coupling light into and/or out of a waveguide, in accordance with the techniques described in this disclosure.

FIG. 1 is an illustration depicting an example artificial reality system includes an optical assembly including at least one Bragg grating, in accordance with the techniques described in this disclosure. In the example of FIG. 1, artificial reality system 100 includes HMD 112, one or more controllers 114A and 114B (collectively, "controller(s) 114"), and may in some examples include one or more external sensors 90 and/or a console 106.

HMD 112 is typically worn by user 110 and includes an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 100 may alternatively, or additionally, include glasses or other display devices for presenting artificial reality content 122 to user 110.

Each controller(s) 114 is an input device that user 110 may use to provide input to console 106, HMD 112, or another component of artificial reality system 100. Controller 114 may include one or more presence-sensitive surfaces for detecting user inputs by detecting a presence of one or more objects (e.g., fingers, stylus) touching or hovering over locations of the presence-sensitive surface. In some examples, controller(s) 114 may include an output display, which may be a presence-sensitive display. In some examples, controller(s) 114 may be a smartphone, tablet computer, personal data assistant (PDA), or other hand-held device. In some examples, controller(s) 114 may be a smartwatch, smartring, or other wearable device. Controller(s) 114 may also be part of a kiosk or other stationary or mobile system. Alternatively, or additionally, controller(s) 114 may include other user input mechanisms, such as one or more buttons, triggers, joysticks, D-pads, or the like, to enable a user to interact with and/or control aspects of the artificial reality content 122 presented to user 110 by artificial reality system 100.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as being in communication with, e.g., tethered to or in wireless communication with, console 106, in some implementations HMD 112 operates as a stand-alone, mobile artificial reality system, and artificial reality system 100 may omit console 106.

In general, artificial reality system 100 renders artificial reality content 122 for display to user 110 at HMD 112. In the example of FIG. 1, a user 110 views the artificial reality content 122 constructed and rendered by an artificial reality application executing on HMD 112 and/or console 106. In some examples, the artificial reality content 122 may be fully artificial, i.e., images not related to the environment in which user 110 is located. In some examples, artificial reality content 122 may form part of an augmented reality or a mixed reality, in which artificial reality content 122 is displayed over and coordinated with real world views. In some examples, artificial reality content 122 may include a mixture of real-world imagery (e.g., a hand of user 110, controller(s) 114, other environmental objects near user 110) and virtual objects to produce mixed reality and/or augmented reality. In some examples, virtual content items may be mapped (e.g., pinned, locked, placed) to a particular position, e.g., relative to the real-world. A position for a virtual content item may be fixed, as relative to one of a wall or the earth, for instance. A position for a virtual content item may be variable, as relative to controller(s) 114 or a user, for instance. In some examples, the particular position of a virtual content item within artificial reality content 122 is associated with a position within the real-world, physical environment (e.g., on a surface of a physical object).

During operation, the artificial reality application constructs artificial reality content 122 for display to user 110 by tracking and computing pose information for a frame of reference, typically a viewing perspective of HMD 112. Using HMD 112 as a frame of reference, and based on a current field of view as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 100 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality, overlying the real world. In some examples, the artificial reality application may render images of real-world objects, such as the portions of peripheral device 136, hand 132, and/or arm 134 of user 110, that are within field of view 130 along the virtual objects, such as within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application may not render representations of the hand 132 or arm 134 of the user.

In accordance with the techniques of this disclosure, HMD 112 includes an optical system that includes at least one Bragg grating for coupling light into and/or out of a waveguide. The light may, for example, be light output from a projector or display producing artificial reality content 122 for user 110. As described herein, the one or more Bragg gratings of the optical system may be configured to exhibit similar diffractive efficiencies and diffraction angles for light of a plurality of wavelengths or wavelength ranges. For example, the at least one Bragg grating may be configured to exhibit similar diffractive efficiencies for red, green, and blue light. Additionally, the at least one Bragg grating may be configured to couple light of a plurality of different wavelengths or wavelength ranges (e.g., red, green, and blue light wavelength ranges) into and/or out of a waveguide at a substantially similar diffraction angle. The at least one Bragg grating may include a reflective Bragg grating, a transmissive Bragg grating, or both a reflective Bragg grating and a transmissive Bragg grating.

In some examples, the at least one Bragg grating is structured to include a plurality of layer pairs. Moreover, in some examples, at least some of the layer pairs include a first layer including a first material and a second layer including a second material, where the first material has a first refractive index and the second material has a second refractive index different from the first refractive index. By properly selecting the first and second refractive indices and thicknesses of the first and second layers, the at least one Bragg grating may be structured so as to exhibit similar diffractive efficiencies and diffraction angles for a plurality of wavelengths of light. For example, a diffractive efficiency and diffraction angle of a selected diffraction order for a first wavelength of light may be similar to a diffractive efficiency and diffraction angle of a selected diffraction order for a second wavelength of light. The selected diffraction order may be different for the first and second wavelengths of light. In some examples, the first and second wavelengths may be different by at least a threshold amount, such as at least 50 nm or at least 75 nm. For example, the first wavelength may be a wavelength from a blue portion of the spectrum and the second wavelength may be a wavelength from a green or red portion of the spectrum.

By including at least one Bragg grating exhibiting the properties described herein, a single waveguide may be used for multiple colors of light with reduced image artifacts. For example, in optical assemblies that use a single in-coupling grating and a single out-couple grating that do not exhibit similar diffraction efficiencies and/or diffraction angles for light of different wavelengths (e.g., colors of light), the output image may include different color intensities than the input image, and may exhibit aberrations due to the different diffraction angles for the different wavelengths. One solution to these deficiencies is to use multiple waveguides, each with associated coupling gratings configured to diffract a selected wavelength or wavelength range. This may address some of the color issues and diffraction angle issues, but may introduce additional cost, weight, an/or size, due to increasing the part count. Additionally, precisely aligning the multiple waveguides may be difficult and lead to increased manufacturing complexity and cost.

In contrast, the Bragg gratings described herein may allow use of a single waveguide with a single in-coupling grating and/or a single out-coupling grating for multiple wavelengths of light. This may reduce part count, thus reducing cost, weight, and/or size of the optical assembly, and may simplify manufacturing compared to optical assemblies that use multiple waveguides, while still providing acceptable optical performance.

Figure 2A:
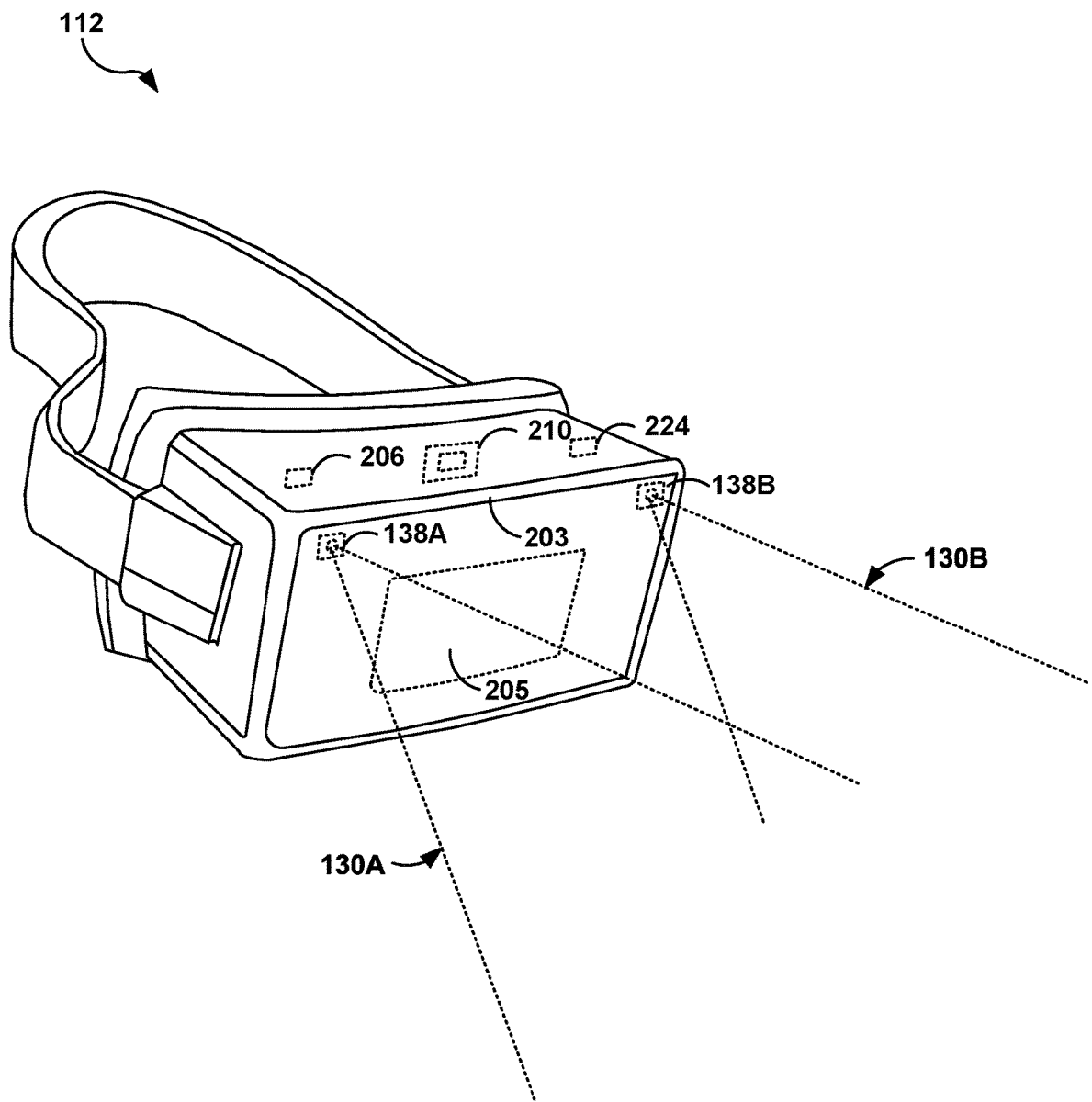
FIG. 2A is an illustration depicting an example HMD that includes at least one Bragg grating for coupling light into and/or out of a waveguide, in accordance with techniques described in this disclosure.

FIG. 2A is an illustration depicting an example HMD 112 that includes an optical assembly including at least one Bragg grating, in accordance with techniques described in this disclosure. HMD 112 of FIG. 2A may be an example of HMD 112 of FIG. 1. HMD 112 may be part of an artificial reality system, such as artificial reality system 100 of FIG. 1, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user via an optical assembly 205. Electronic display 203 may be any suitable display technology, including, for example, a liquid crystal display (LCD), an organic light emitting diode (OLED) display, a light emitting diode (LED display, e.g., a microLED display), an active matrix OLED (AMOLED) display, a liquid crystal on silicon (LCoS) display, or the like. In some examples, the electronic display is a stereoscopic display or is two displays for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

Optical assembly 205 includes optical elements configured to manage light output by electronic display 203 for viewing by the user of HMD 112 (e.g., user 110 of FIG. 1). The optical elements may include, for example, one or more lens, one or more diffractive optical element, one or more reflective optical element, one or more waveguide, or the like, that manipulates (e.g., lenses, reflects, refracts, diffracts, guides, or the like) light output by electronic display 203. Optical assembly 205 may include a waveguide and at least one Bragg grating configured to couple light into and/or out of the waveguide. For example, optical assembly 205 may be any of the optical assemblies described herein with reference to FIGS. 1 and 5-7.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including peripheral device 136 and/or hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

Figure 2B:
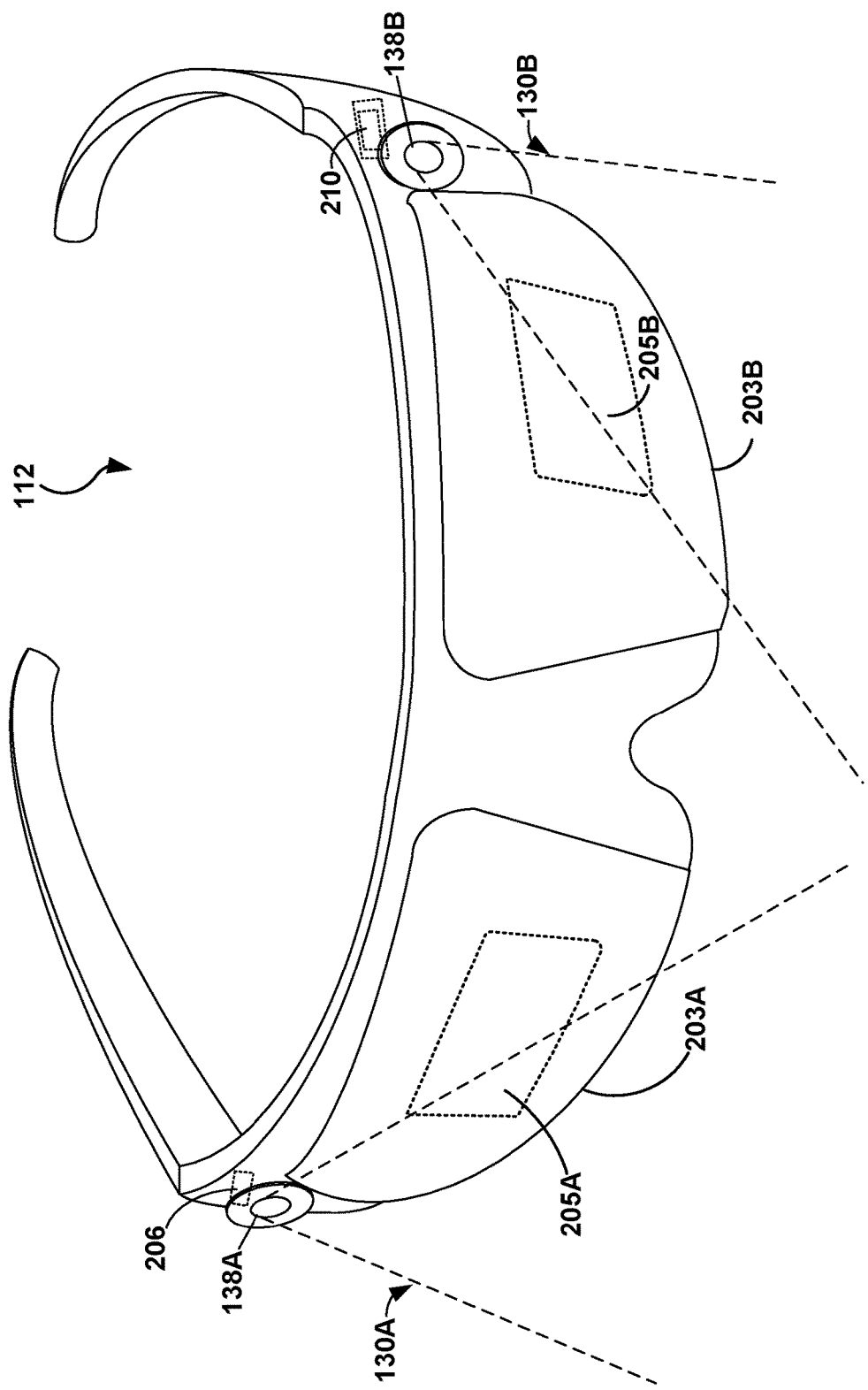
FIG. 2B is an illustration depicting another example HMD that includes at least one Bragg grating for coupling light into and/or out of a waveguide, in accordance with techniques described in this disclosure.

FIG. 2B is an illustration depicting another example HMD 112, in accordance with techniques described in this disclosure. As shown in FIG. 2B, HMD 112 may take the form of glasses. HMD 112 of FIG. 2A may be an example of HMD 112 of FIG. 1. HMD 112 may be part of an artificial reality system, such as artificial reality system 100 of FIG. 1, or may operate as a stand-alone, mobile artificial reality system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. The front frame and arms position lenses in front of the user's eyes. The lenses may include at least a portion of an optical assembly configured to receive light from a projector or display and redirect the light for viewing by the user. For example, a projector may be mounted to the front frame or temples of HMD 112 and project light toward the lenses, e.g., in free field or through a waveguide. The lenses may include one or more layers or coatings that direct the light toward the user's eyes. In this way, HMD 112 of FIG. 2B may effectively include one or more interior-facing displays 203A and 203B (collectively, "displays 203") configured to present artificial reality content to the user and one or more optical assemblies 205A and 205B (collectively, "optical assemblies 205") configured to manage light output by displays 203. In some examples, the known orientation and position of displays 203 or the lenses of HMD 112 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, one or more integrated image capture devices 138A and 138B (collectively, "image capture devices 138"), an internal control unit 210, which may include an internal power source and one or more printed-circuit boards having one or more processors, memory, and hardware to provide an operating environment for executing programmable operations to process sensed data and present artificial reality content on display 203.

Figure 3:
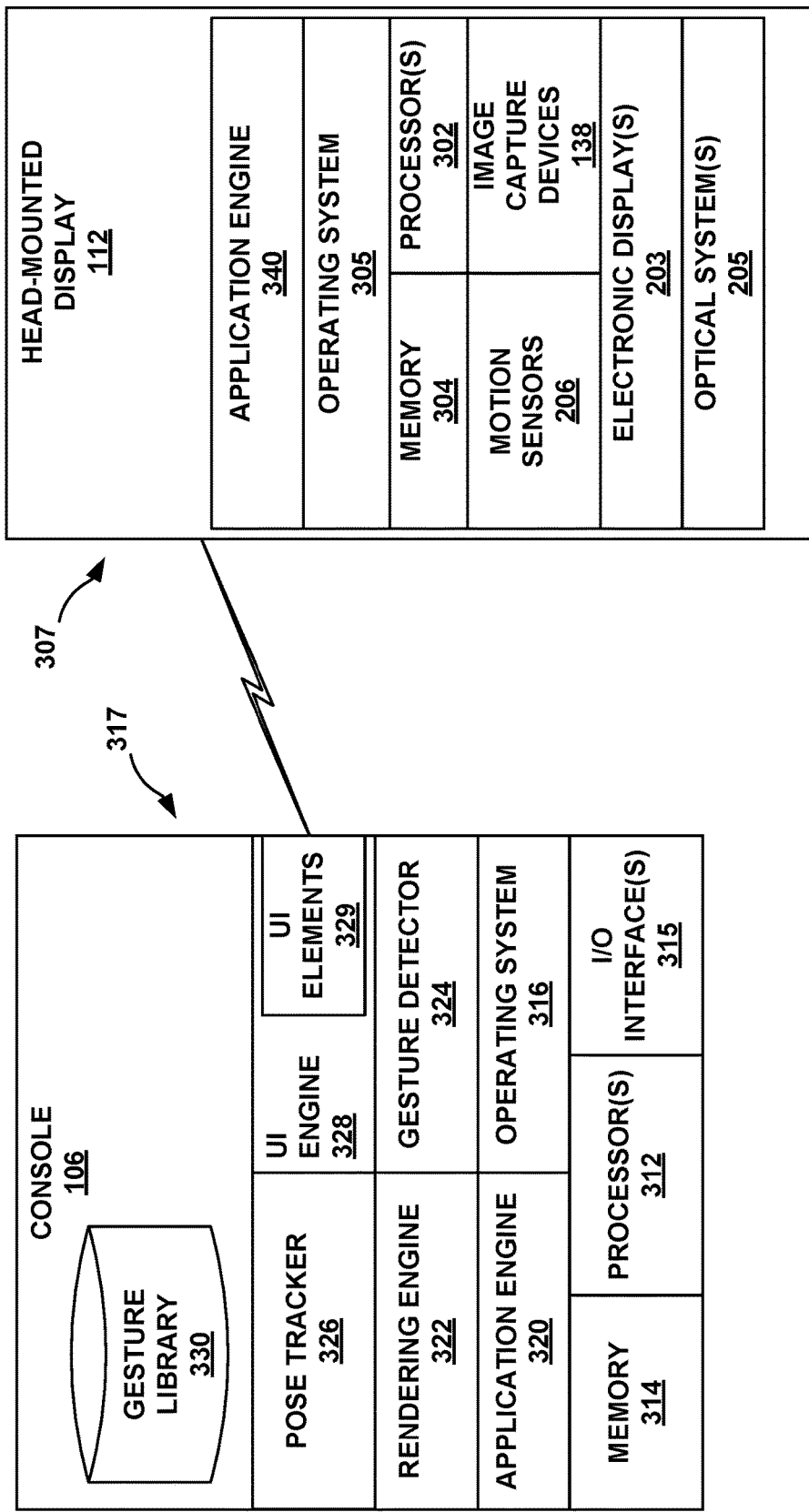
FIG. 3 is a block diagram showing example implementations of a console and an HMD of the artificial reality system of FIG. 1, in accordance with techniques described in this disclosure.

FIG. 3 is a block diagram showing example implementations of an artificial reality system that includes console 106 and HMD 112, in accordance with techniques described in this disclosure. In the example of FIG. 3, console 106 performs pose tracking, gesture detection, and user interface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 203, motion sensors 206, image capture devices 138, and, in some examples, optical assembly 205. In some examples, processors 302 and memory 304 may be separate, discrete components. In other examples, memory 304 may be on-chip memory collocated with processors 302 within a single integrated circuit.

In general, console 106 is a computing device that processes image and tracking information received from image capture devices 138 to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controller(s), display device(s), image capture device(s), HMD(s), peripheral device(s), and the like. Moreover, the one or more I/O interfaces 315 may include one or more wired or wireless network interface controllers (NICs) for communicating with a network, such as network 104.

Software applications 317 of console 106 operate to provide an overall artificial reality application. In this example, software applications 317 include application engine 320, rendering engine 322, gesture detector 324, pose tracker 326, and user interface engine 328.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIG. 1), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for HMD 112 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth.

Console 106 may output this virtual user interface and other artificial reality content, via a communication channel, to HMD 112 for display at HMD 112.

Based on the sensed data from any of the image capture devices 138, or other sensor devices, gesture detector 324 analyzes the tracked motions, configurations, positions, and/or orientations of controllers 114 and/or objects (e.g., hands, arms, wrists, fingers, palms, thumbs) of the user 110 to identify one or more gestures performed by user 110. More specifically, gesture detector 324 analyzes objects recognized within image data captured by image capture devices 138 of HMD 112 and/or sensors 90 and external cameras 102 to identify controller(s) 114 and/or a hand and/or arm of user 110, and track movements of controller(s) 114, hand, and/or arm relative to HMD 112 to identify gestures performed by user 110. In some examples, gesture detector 324 may track movement, including changes to position and orientation, of controller(s) 114, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of controller(s) 114 and process the user inputs to detect one or more gestures performed by user 110 with respect to controller(s) 114.

Figure 4:
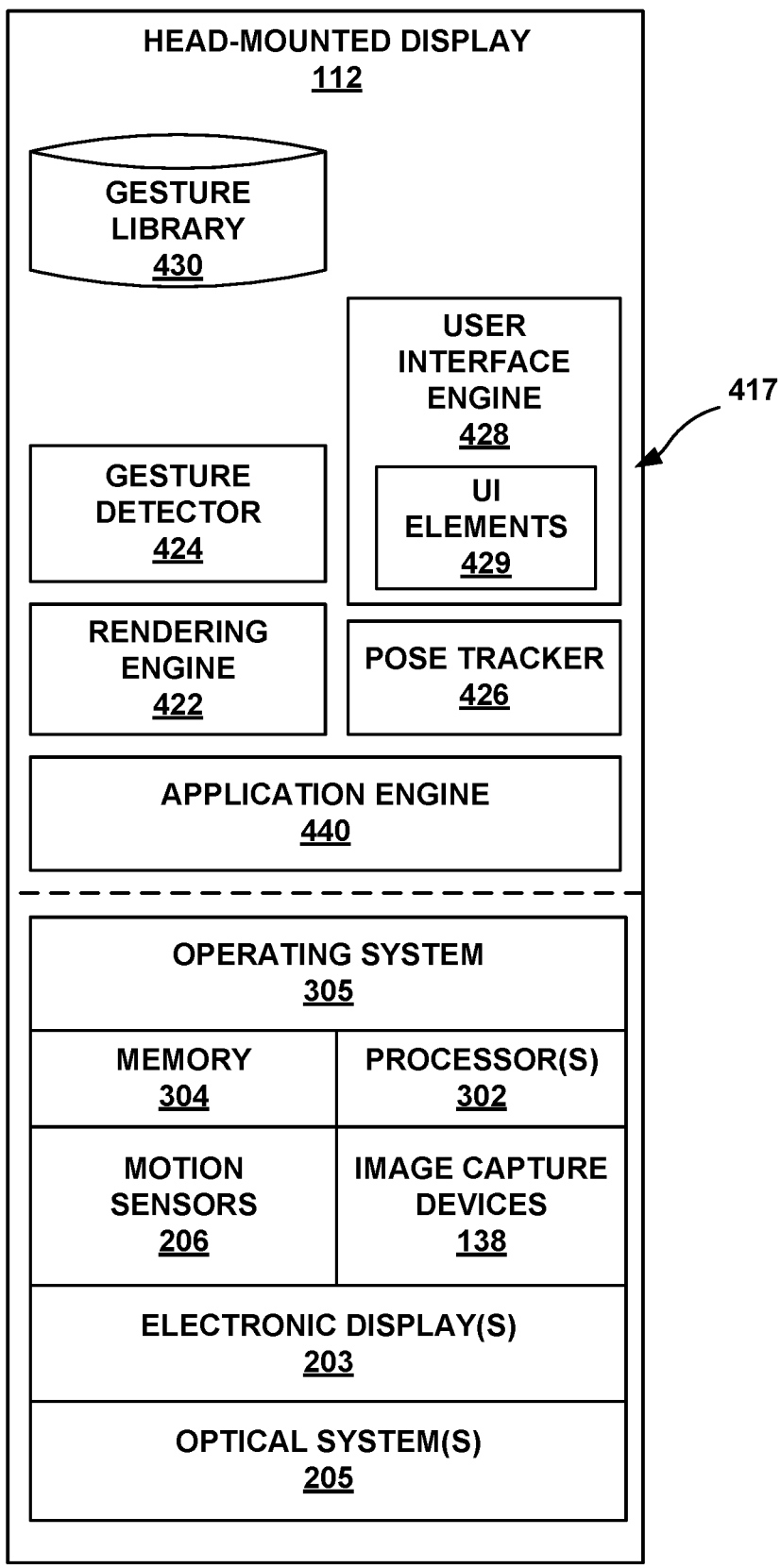
FIG. 4 is a block diagram depicting an example of a stand-alone HMD of an artificial reality system, in accordance with the techniques described in this disclosure.

FIG. 4 is a block diagram depicting an example in which HMD 112 is a standalone artificial reality system, in accordance with the techniques described in this disclosure. In this example, like FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display(s) 203, varifocal optical system(s) 205, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices 138 or 102, controller(s) 114, or other sensor devices, gesture detector 424 analyzes the tracked motions, configurations, positions, and/or orientations of controller(s) 114 and/or objects (e.g., hands, arms, wrists, fingers, palms, thumbs) of the user to identify one or more gestures performed by user 110.

Figure 5A:
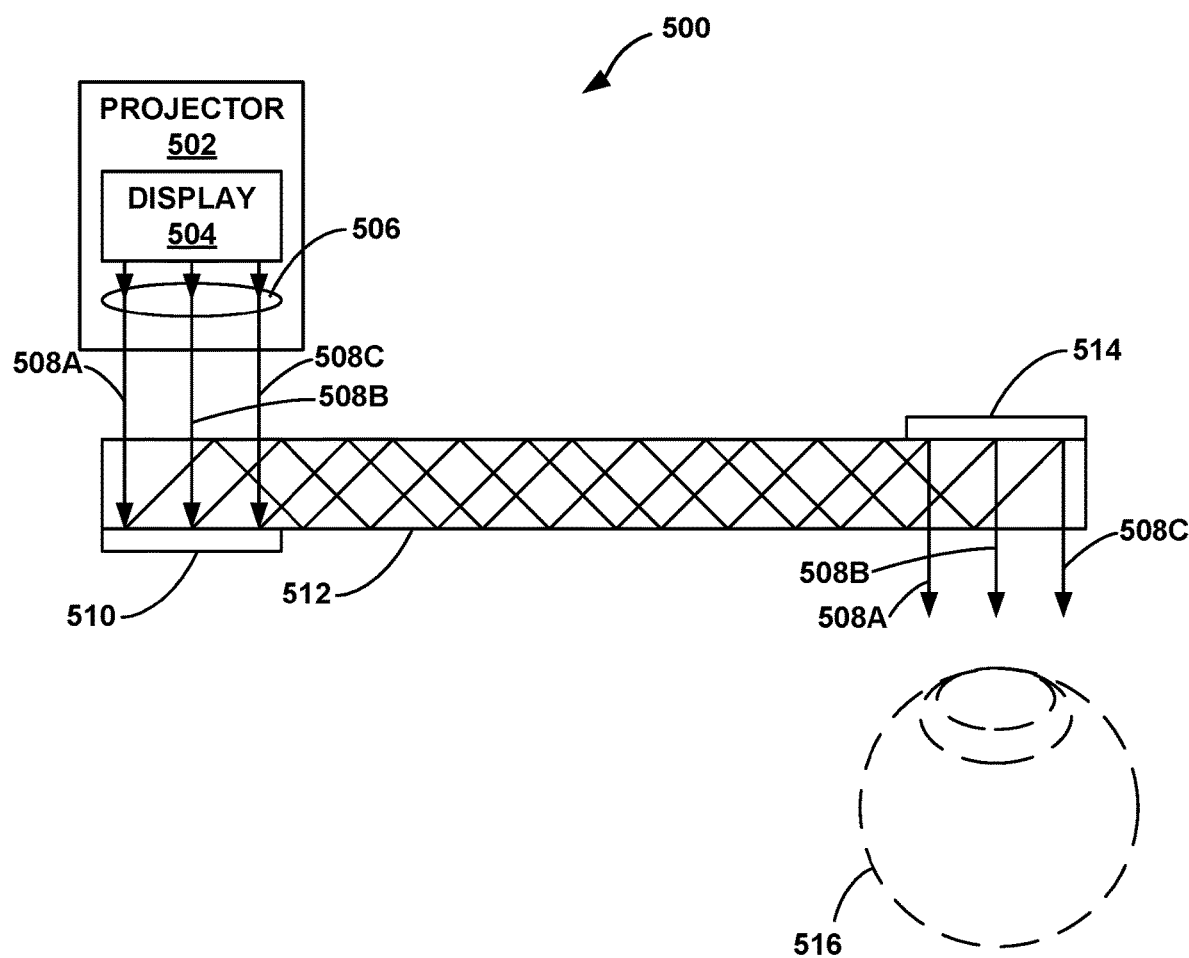
FIGS. 5A and 5B are conceptual diagrams illustrating example optical systems that includes a projector, a waveguide, and input and output coupling gratings.

FIG. 5A is a conceptual diagram illustrating an example optical assembly 500 that includes a projector 502, a waveguide 512, and input and output coupling gratings 510, 514. Input and output coupling gratings 510, 514 include reflective Bragg gratings as described herein. Optical assembly 500 may, as one example, represent optical elements of HMD 112 of an artificial reality system as described herein, such as elements of displays 203 and optical systems 205 for generating and outputting display content to user 110.

In this example, projector 502 includes a display 504 and optical system 506. Display 504 may include suitable display type, including, for example, an LCD; an OLED display; a LED display, e.g., a microLED display; an active matrix OLED (AMOLED) display, a liquid crystal on silicon (LCoS) display, or the like. Display 504 outputs light 508A, 508B, 508C (collectively, "light 508") directed at optical system 506. Light 508 may include a plurality of wavelengths, e.g., three wavelengths. For example, first light 508A may include a first wavelength, second light 508B may include a second wavelength, and third light 508C may include a third wavelength. As an example, first light 508A may include red light having a wavelength or wavelength range within the range of between about 635 nm and about 700 nm (such as between about 665 nm and about 675 nm or about 670 nm), second light 508B may include green light with a wavelength or wavelength range within the range between about 520 nm and about 560 nm (such as between about 530 nm and about 540 nm or about 536 nm), and third light 508C may include blue light with a wavelength between about 440 nm and about 490 nm (such as between about 440 nm and about 450 nm or about 446 nm). Generally, light 508 may include at least two wavelengths or wavelength ranges. In some examples, the wavelengths or wavelength ranges may be different by at least about 50 nm, or at least about 75 nm. The wavelength range may include a range of about 2 nm, about 5, nm, or about 10 nm, as examples.

Optical system 506 may be part of projector 502 and receives light 508 from display 504. Optical system 506 may include one or more optical elements configured to direct light from display 504 to waveguide 512. For example, optical system 506 may include one or more lensing elements, one or more polarization control elements, one or more reflectors, or the like, to control light output by display. In some examples, optical system 506 may substantially collimate (e.g., collimate or nearly collimate) light output by display 504.

Waveguide 512 includes any suitable material or combination of materials for directing light from one portion of waveguide 512 (e.g., adjacent input coupling grating 510) to another portion of waveguide 512 (e.g., adjacent to output coupling grating 514). For example, waveguide 512 may include a core material and a coating material, where the core material and coating material are selected such that their refractive indices support total internal reflection for at least some input angles of light. As another example, waveguide 512 may include a material having a refractive index sufficiently different from air such that the waveguide 512 exhibits total internal reflection for at least some input angles of light.

Input coupling grating 510 and output coupling grating 510 and 514 are configured to couple light into and out of waveguide 512, respectively. Any suitable coupling grating may be used for input coupling grating 510 and/or output coupling grating 514, including, for example, surface relief gratings, holographic gratings, or the like. In some examples, input coupling grating 510 and/or output coupling grating 514 are reflective gratings, as shown in FIG. 5. In other examples, one or both of input coupling grating 510 or output coupling grating 514 may be a transmissive grating.

Input coupling grating 510 is configured to receive light 508 from projector 502 (e.g., optical system 506 of projector 502) and couple at least a portion of the light into total internal reflection (TIR) within waveguide 512. Output coupling grating 514 is configured to out-couple light 508 from waveguide 512 and direct light 508 toward an eye 516 of a viewer (e.g., a user of HMD 112).

In accordance with examples of this disclosure, at least one of input coupling grating 510 or output coupling grating 514 includes a Bragg grating configured as described herein. In some examples, only one of input coupling grating 510 or output coupling grating 514 includes a Bragg grating as described herein. In other examples, both of input coupling grating 510 and output coupling grating 514 include a Bragg grating structured as described herein. The at least one Bragg grating may be configured to exhibit similar diffractive efficiencies and diffraction angles for light of a plurality of different wavelengths, such as range(s) of wavelengths within the red, green and/or blue regions of the light spectrum. That is, as one example, the at least one Bragg grating may be configured to exhibit similar diffractive efficiencies for red, green, and blue light (e.g., first light 508A, second light 508B, and third light 508C). Although only a single input coupling grating 510 and a single output coupling grating 514 are shown, multiple gratings may be used as input and/or output coupling gratings. Further, FIG. 5A illustrates an example in which both input coupling grating 510 and output coupling grating 514 are reflective Bragg gratings.

Figure 5B:
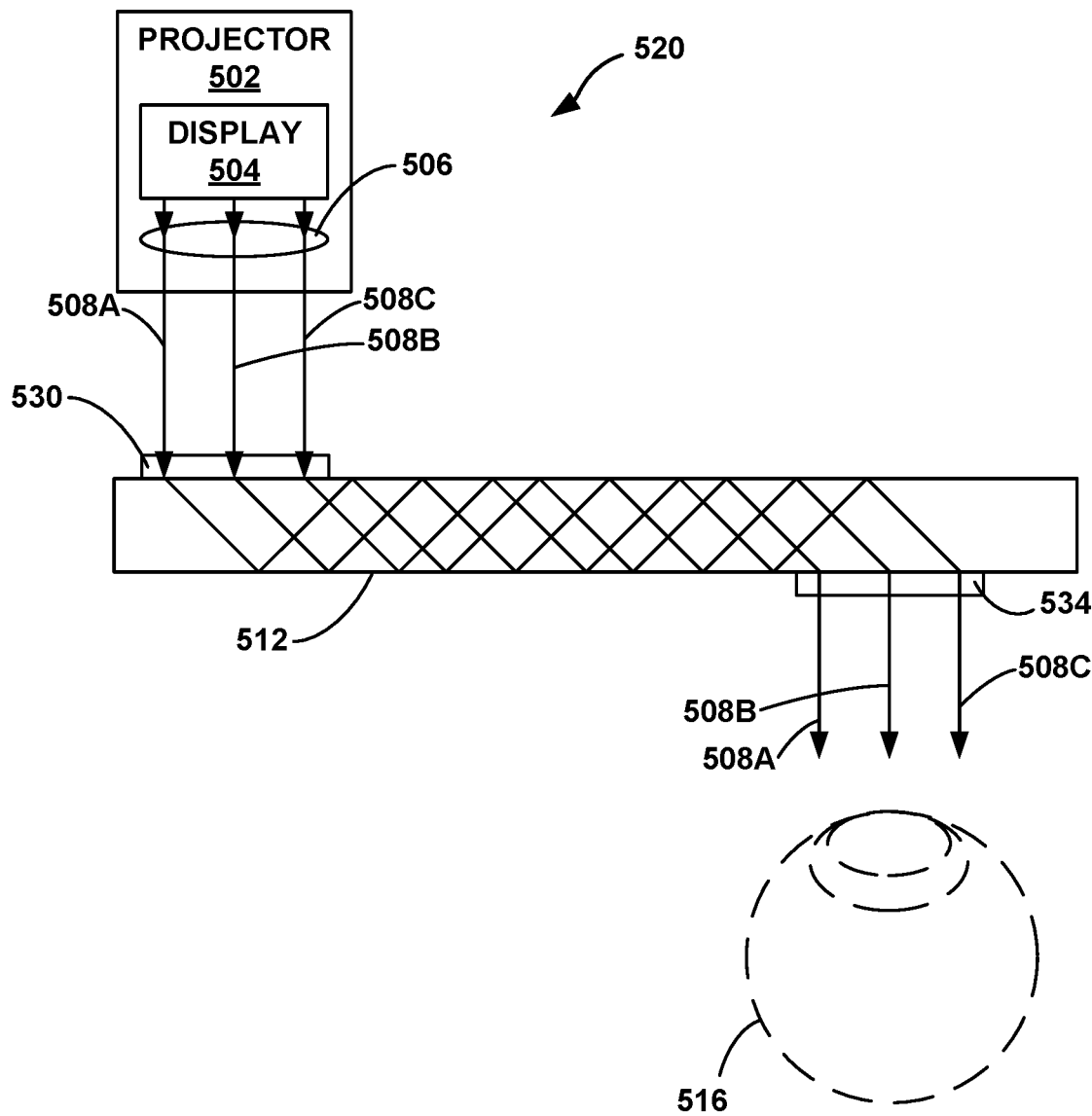

FIG. 5B is a conceptual diagram illustrating an example optical assembly 520 that includes a projector 502, a waveguide 512, and input and output coupling gratings 530, 534. Optical assembly 520 is substantially similar to optical assembly 500 of FIG. 5A, aside from input and output coupling gratings 530, 534 including transmissive Bragg gratings as described herein. In other examples, one of input coupling grating 530 or output coupling grating 534 may include a reflective Bragg grating and the other of input coupling grating 530 or output coupling grating 534 may include a transmissive Bragg grating.

Figure 6:
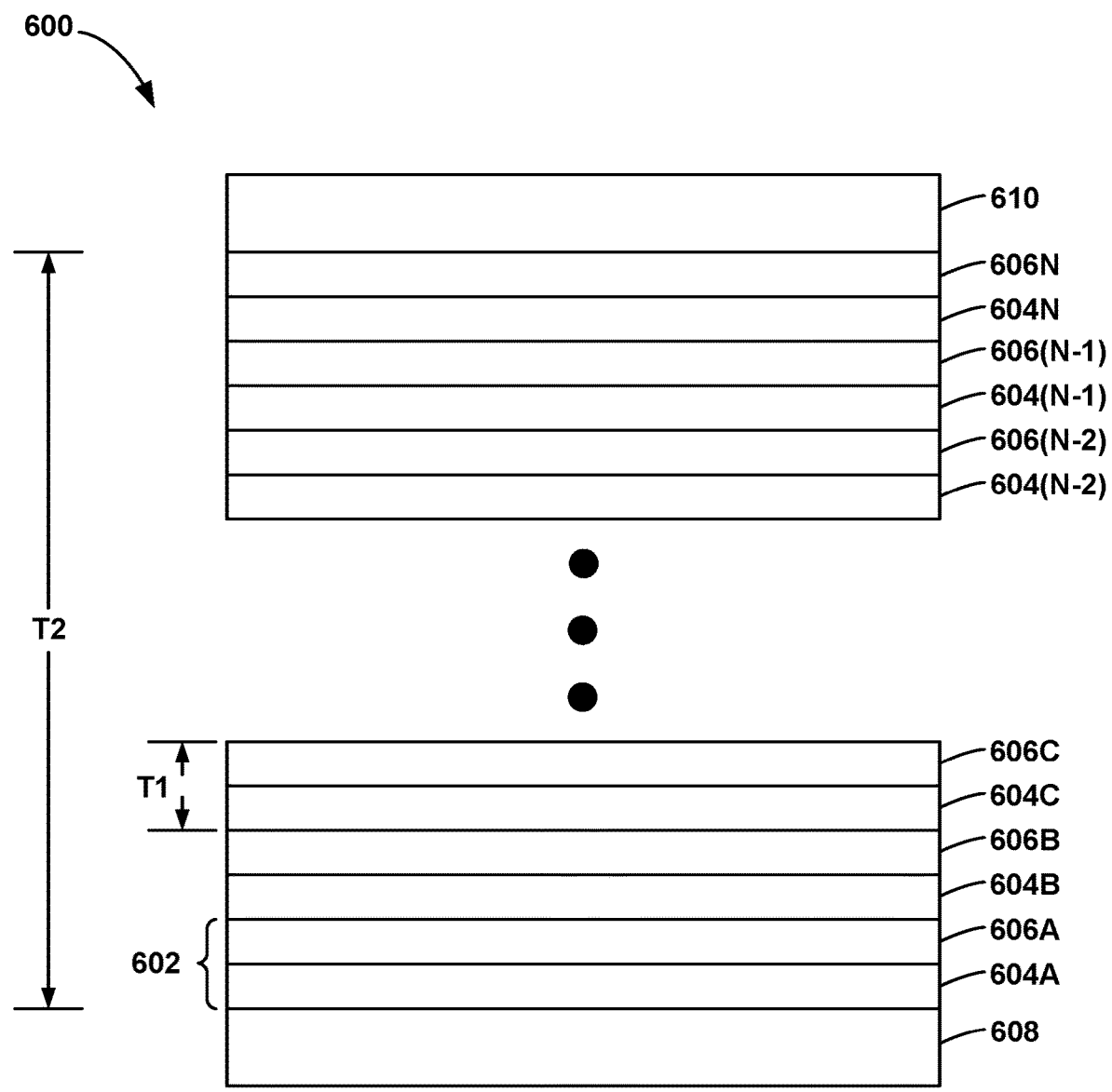
FIG. 6 is a conceptual diagram illustrating an example reflective Bragg grating.

FIG. 6 is a conceptual diagram illustrating an example reflective Bragg grating 600, which may, in some examples, be utilized for any of gratings 510, 514. In the example of FIG. 6, reflective Bragg grating 600 includes a plurality of layer pairs 602. A layer pair of layer pairs 602 includes a first layer (e.g., first layer 604A) of a first material and a second layer (e.g., second layer 606A) of a second material. In some examples, such as shown in FIG. 6, each layer pair of the plurality of layer pairs 602 is substantially similar in composition and thickness (e.g., the same within manufacturing limitations). For example, each layer pair of the plurality of layer pairs 602 may include a respective first layer 604A-604N (collectively, "first layers 604") and a respective second layer 606A-606N (collectively, "second layers 606"). In other examples, at least one of the layer pairs includes a property different than another one of the layer pairs (e.g., layer composition, thickness, or the like).

The first material of first layers 604 exhibits a first refractive index. The second material of second layers 606 exhibits a second refractive index. The first and second refractive indices are different, and may be different by at least about 0.1, or at least about 0.2, or at least about 0.25, or about 0.3. For example, the first material of first layers 604 may exhibit a first refractive index of about 1.5 and the second material of second layers 606 may exhibit a second refractive index of about 1.8 (for a difference of about 0.3). Each of first layers 604 and second layers 606 may include any suitable material, such as a polymer, a glass, or the like. For example, each of first layers 604 may include a first polymer and each of second layers 606 may include a second polymer. In this way, reflective Bragg grating 600 includes a plurality of interfaces between materials having dissimilar refractive indices, at which reflection and/or refraction can occur.

Each of first layers 604 and second layers 606 may have a selected thickness. In some examples, the thicknesses of a first layer 604 and a second layer 606 in a layer pair is substantially the same (e.g., the same within manufacturing tolerances). In other examples, within a layer pair, the thickness of a first layer 604 may be different from a thickness of a second layer 606. A thickness, T1, of a layer pair may be referred to as a Bragg pitch. In some examples, the Bragg pitch, T1, may be between about 800 nm and about 900 nm, such as between about 800 nm and about 825 nm.

Similarly, in some examples, each of first layers 604 may have substantially the same thickness (e.g., the same within manufacturing tolerances). In some examples, each of second layers 606 may have substantially the same thickness (e.g., the same within manufacturing tolerances). In other examples, at least one of first layers 604 may have a different thickness than another of first layers 604 and/or at least one of second layers 606 may have a different thickness than another of second layers 606.

The thicknesses of first layers 604 and second layers 606 may be selected based upon desired wavelengths for reflective Bragg grating 600 to reflect. In some examples, the thicknesses may be on the order of hundreds of nanometers.

Reflective Bragg grating 600 may include any suitable number of layer pairs 602. In some examples, more layer pairs 602 may increase a diffractive efficiency of reflective Bragg grating 600 such that a greater fraction of incident light is reflected. In some examples, reflective Bragg grating 600 may include at least ten layer pairs 602, such as at least 15 layer pairs 602, or tens of layer pairs 602. In other examples, reflective Bragg grating 600 may include fewer than ten layer pairs 602 or more than 100 layer pairs 602. A total thickness, T2, of the plurality of layer pairs 602 of reflective Bragg grating 600 may be the number of layer pairs multiplied by the Bragg pitch, T1. In some examples, the total thickness, T2, of the plurality of layer pairs 602 is on the order of tens of micrometers, such as between about 10 micrometers and about 20 micrometers.

Reflective Bragg grating 600 also includes a bottom substrate 608 and a top substrate 610. Bottom substrate 608 and top substrate 610 may be configured to provide structural support for reflective Bragg grating 600. Bottom substrate 608 and top substrate 610 may include any material substantially transparent to wavelengths of light 508 output by projector 502 to be incident on reflective Bragg grating 600. In some examples, bottom substrate 608 and top substrate 610 may include a glass, a polymer, or the like. In some implementations, one or both of bottom substrate 608 and top substrate 610 may be omitted and, for example, reflective Bragg grating 600 may be formed directly on waveguide (e.g., waveguide 512).

In the example of FIG. 6, major surfaces (or major planes) of layers 604 and 606 are substantially parallel to the major planes of bottom substrate 608 and top substrate 610. The major surfaces (or major planes) of layers 604 and 606 also may be substantially parallel to a major surface of the waveguide 512 into which or out of which reflective Bragg grating 600 is configured to couple light.

By properly selecting the first and second refractive indices and thicknesses of the first and second layers 604 and 606, reflective Bragg grating 600 may exhibit similar diffractive efficiencies and/or diffraction angles for a plurality of selected wavelengths of light 508. For example, a diffractive efficiency and/or diffraction angle of a selected diffraction order for a first wavelength of light 508A may be similar to a diffractive efficiency and/or diffraction angle of a selected diffraction order for a second wavelength of light 508B and/or may be similar to a diffractive efficiency and/or diffraction angle of a selected diffraction order for a third wavelength of light 508C. The selected diffraction order may be different for the first and second (and third) wavelengths of light 508A, 508B, and 508C.

To select the properties for constructing reflective Bragg grating 600, the equation $2*n_{ave}*pitch*\cos(\alpha)=m*\lambda$, wherein $n_{ave}$ is the average refractive index of the layer pairs 601 $((n_1+n_2)/2)$; pitch is the Bragg pitch, T1, $\alpha$ is the incidence angle of light 508, m is the diffraction order, and $\lambda$ is the wavelength of light, may be solved for integer values of m in combination with selected values of $n_{ave}$, pitch, $\alpha$, and $\lambda$ to determine which wavelengths will diffract for a given reflective Bragg grating 600 (i.e., a reflective Bragg grating 600 with a selected composition and geometry of layers 604 and 606). When integer values of m satisfy this equation for desired wavelengths of light, diffraction efficiency of reflective Bragg grating 600 for each of the desired wavelengths may be determined, for example, using a simulation program such as COMSOL Multiphysics® modeling software, available from COMSOL, Inc., Burlington, Mass.; or LCDMaster 3D, available from SHINTECH, INC., Houston, Tex. The resulting reflective Bragg grating 600 may exhibit substantially similar diffractive efficiencies for the desired wavelengths of light. As used herein, in some examples, "substantially similar diffractive efficiencies" means within about 10%, in some examples, within about 5%, or in some examples, within 2% diffractive efficiency.

For example, reflective Bragg grating 600 may include the following properties: first refractive index of first layers 604: 1.5; second refractive index of second layers 606: 1.8; Bragg pitch, T1: 813 nm; total thickness, T2: about 15 micrometers; incidence angle: 90 degrees (perpendicular). Such a reflective Bragg grating 600 may exhibit substantially similar diffractive efficiencies for light of about 446 nm, about 536 nm, and about 670 nm, and the diffractive efficiency may be greater than about 0.75 for each of the three wavelengths.

Figure 7:
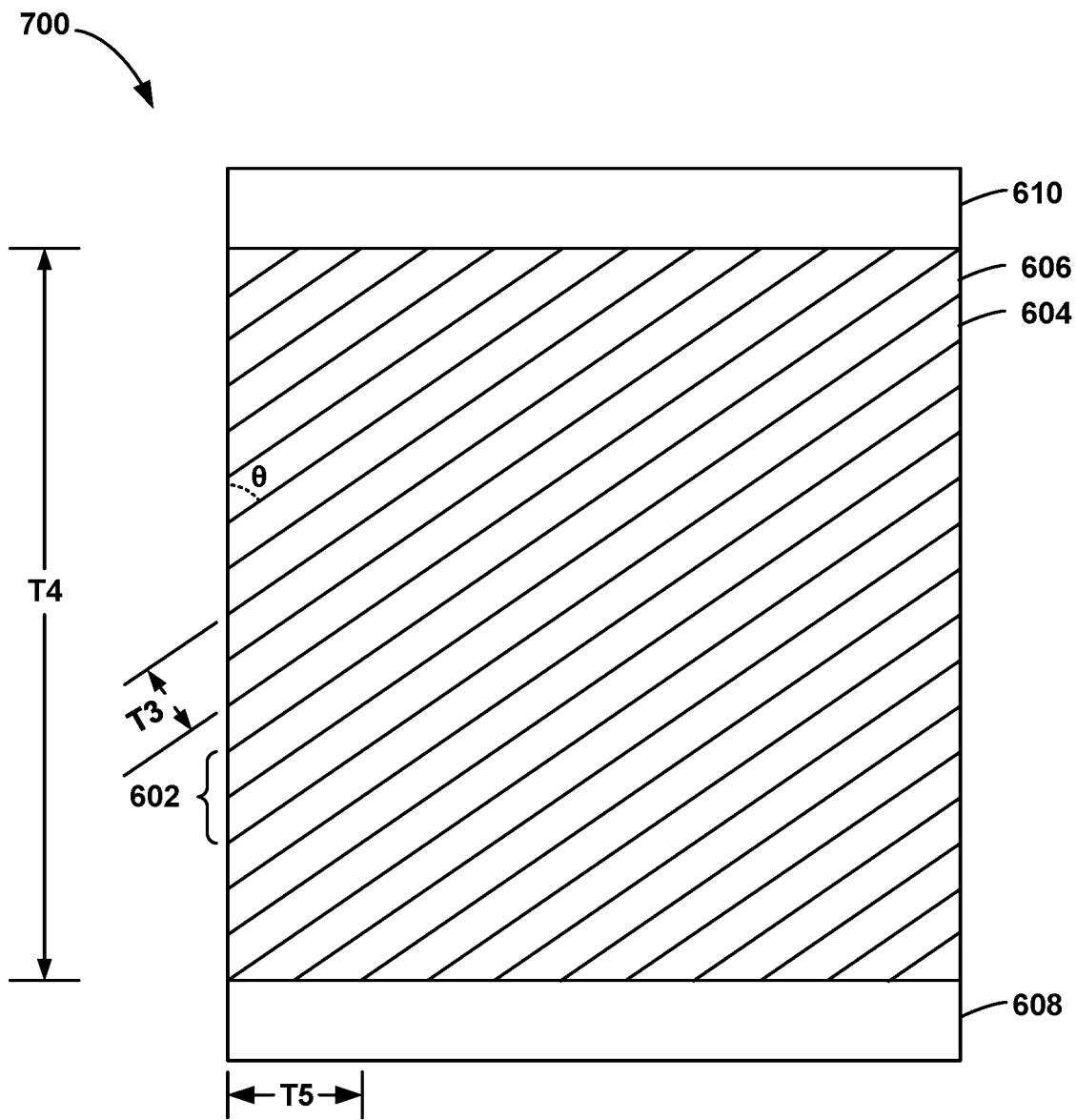
FIG. 7 is a conceptual diagram illustrating another example reflective Bragg grating.

In some examples, rather than first and second layers 604 and 606 being oriented substantially parallel to a major surface of waveguide 512, first and second layers 604 and 606 may be oriented at an angle to a major surface of waveguide 512 to facilitate coupling of light 508 into waveguide 512 with total internal reflection, or to facilitate coupling of light 508 out of waveguide 512. FIG. 7 is a conceptual diagram illustrating another example reflective Bragg grating 700. Like reflective Bragg grating 600, reflective Bragg grating 700 includes a plurality of layer pairs 602, a layer pair including a first layer 604 and a second layer 606. In some examples, each layer pair is substantially the same in composition and thickness. In other examples, at least one layer pair is different from another layer pair in composition and/or thickness. Reflective Bragg grating 700 also includes a bottom substrate 608 and a top substrate 610.

Unlike reflective Bragg grating 600, first and second layers 604 and 606 in reflective Bragg grating 700 are oriented at an angle with respect to a major surface of waveguide 512. In FIG. 7, a slant angle, $\theta$, is defined between the major surfaces of first and second layers 604 and 606 and the normal to the surface of bottom substrate 608 (and, thus, waveguide 512). The slant angle, $\theta$, may be selected to facilitate coupling of light 508 into waveguide 512 with total internal reflection or to facilitate coupling of light 508 out of waveguide 512. In some examples, the slant angle, $\theta$, may be between about 55° and about 70°, such as about 65°.

As shown in FIG. 7, reflective Bragg grating 700 defines a Bragg pitch, T3, which is measured in a direction substantially perpendicular to the major surface of first and second layers 604 and 606. Reflective Bragg grating 700 also defines a horizontal pitch, T5, which is related to the Bragg pitch, T3, and slant angle, $\theta$.

The properties of reflective Bragg grating 700 may be selected using the equation $2*n_{ave}*pitch*\cos(\alpha)=m*\lambda$, as describe with reference to reflective Bragg grating 600. As an example, reflective Bragg grating 700 may include the following properties: first refractive index of first layers 604: 1.5; second refractive index of second layers 606: 1.8; Bragg pitch, T1: 897 nm; total thickness, T5: about 15 micrometers; incidence angle: 90 degrees (perpendicular), slant angle, $\theta$: 65°; horizontal pitch: 2.12 μm. Such a reflective Bragg grating 700 may exhibit substantially similar diffractive efficiencies and diffraction angles for light of about 446 nm, about 536 nm, and about 670 nm, and the diffractive efficiency may be greater than about 0.75 for each of the three wavelengths (e.g., between about 0.75 and about 0.85).

Figure 8:
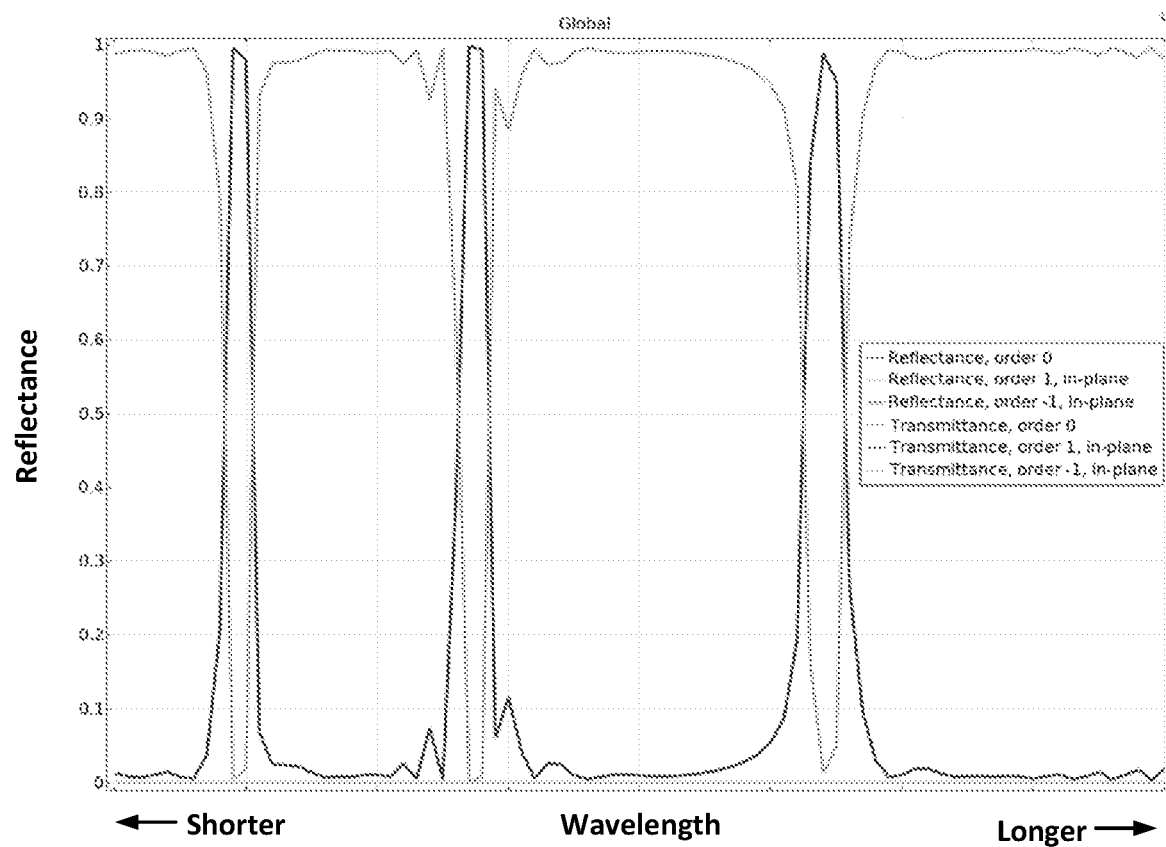
FIG. 8 is a plot of simulated reflectance versus wavelength for an example reflective Bragg grating.

FIG. 8 is a plot of simulated reflectance and transmittance versus wavelength for a reflective Bragg grating with the following properties: first refractive index of first layers 604: 1.5; second refractive index of second layers 606: 1.8; Bragg pitch, T1: 813 nm; total thickness, T2: about 15 micrometers; incidence angle: 90 degrees (perpendicular). As shown in FIG. 8, the reflectance is substantially similar for light with three different wavelengths.

Figure 9:
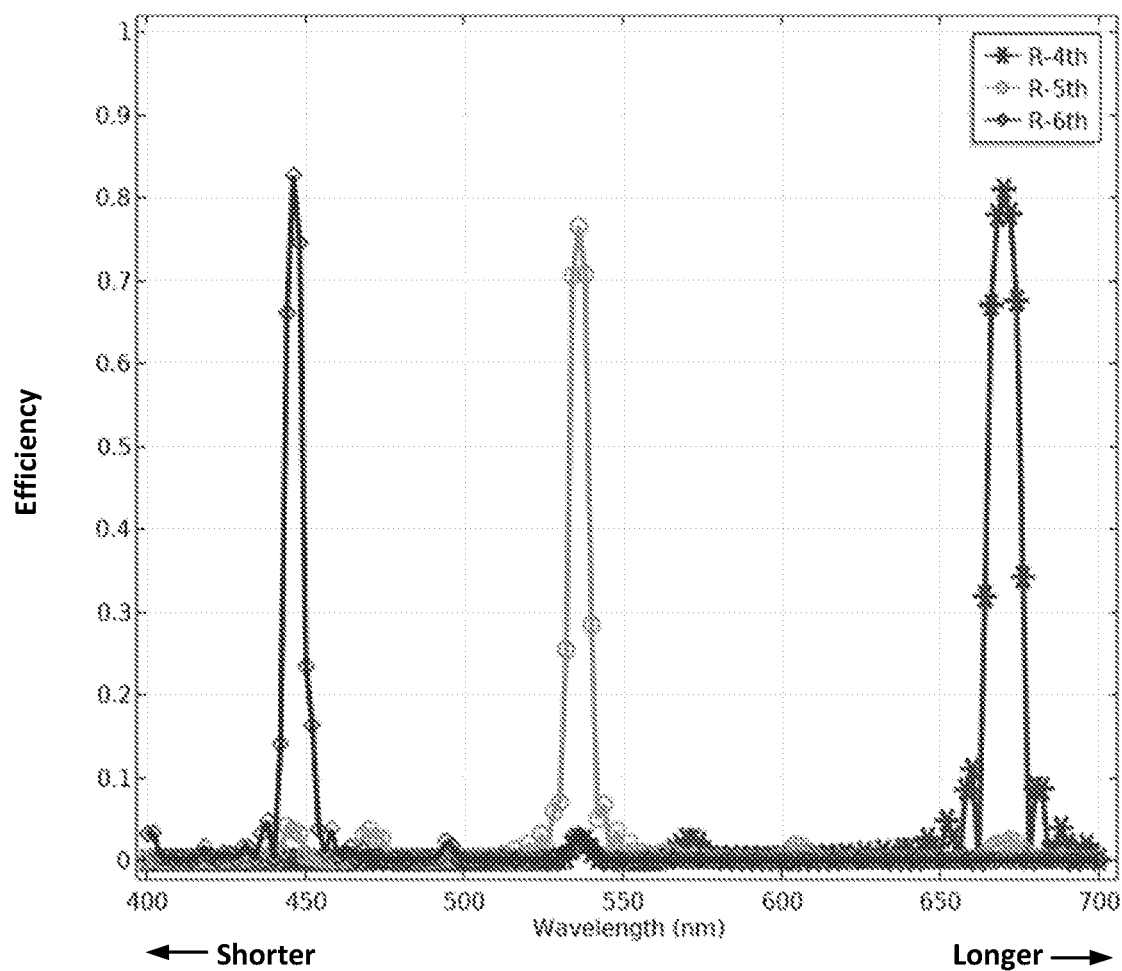
FIG. 9 is a plot of simulated reflective efficiency versus wavelength for an example reflective Bragg grating.

FIG. 9 is a plot of simulated reflective efficiency versus wavelength for an example reflective Bragg grating. The reflective Bragg grating had the following properties: first refractive index of first layers 604: 1.5; second refractive index of second layers 606: 1.8; Bragg pitch, T1: 897 nm; total thickness, T5: about 15 micrometers; incidence angle: 90 degrees (perpendicular), slant angle, $\theta$: 65°; horizontal pitch: 2.12 μm. As shown in FIG. 9, such a reflective Bragg grating is predicted to exhibit substantially similar diffractive efficiencies and diffraction angles for light having three different wavelengths, and the diffractive efficiencies may be greater than about 0.75 for each of the three wavelengths (e.g., between about 0.75 and about 0.85).

Figure 10:
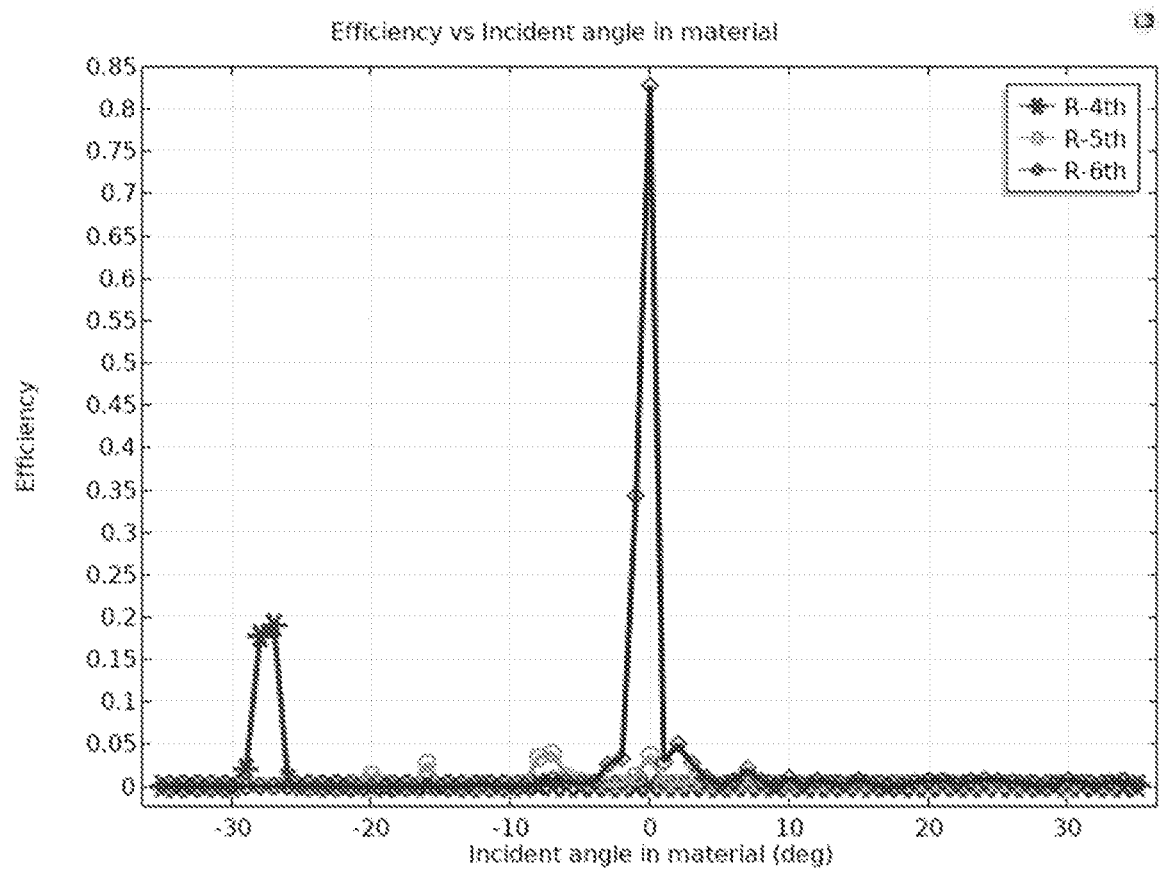
FIG. 10 is a plot of simulated reflective efficiency versus incident angle for an example reflective Bragg grating and light with a wavelength of 446 nm.
Figure 11:
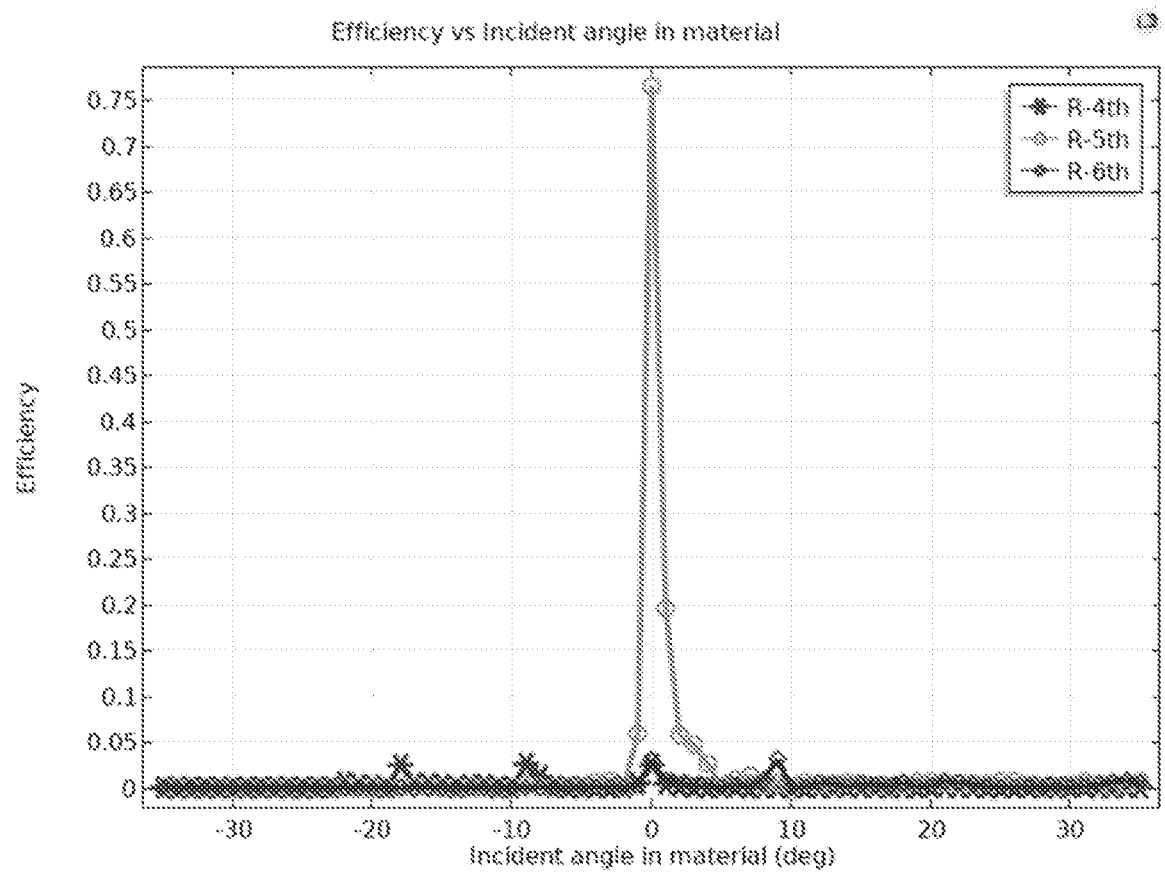
FIG. 11 is a plot of simulated reflective efficiency versus incident angle for an example reflective Bragg grating and light with a wavelength of 536 nm.
Figure 12:
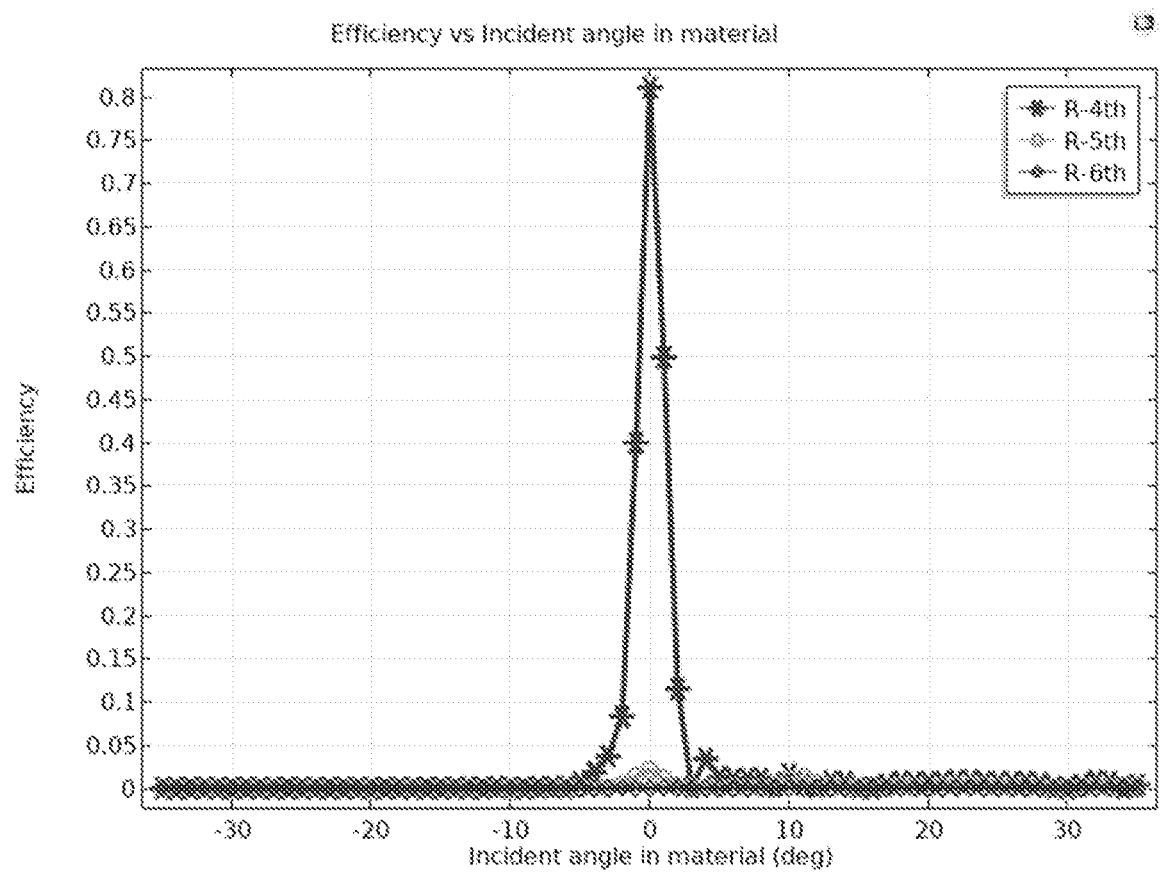
FIG. 12 is a plot of simulated reflective efficiency versus incident angle for an example reflective Bragg grating and light with a wavelength of 670 nm.

FIG. 10 is a plot of simulated reflective efficiency versus incident angle for an example angled reflective Bragg grating (like that shown in FIG. 7) and light with a wavelength of 446 nm. FIG. 11 is a plot of simulated reflective efficiency versus incident angle for an example angled reflective Bragg grating and light with a wavelength of 536 nm. FIG. 12 is a plot of simulated reflective efficiency versus incident angle for an example angled reflective Bragg grating and light with a wavelength of 670 nm. As shown in FIGS. 10-12, the field of view was narrow since the grating is a reflective grating and the birefringence is low.

Figure 13:
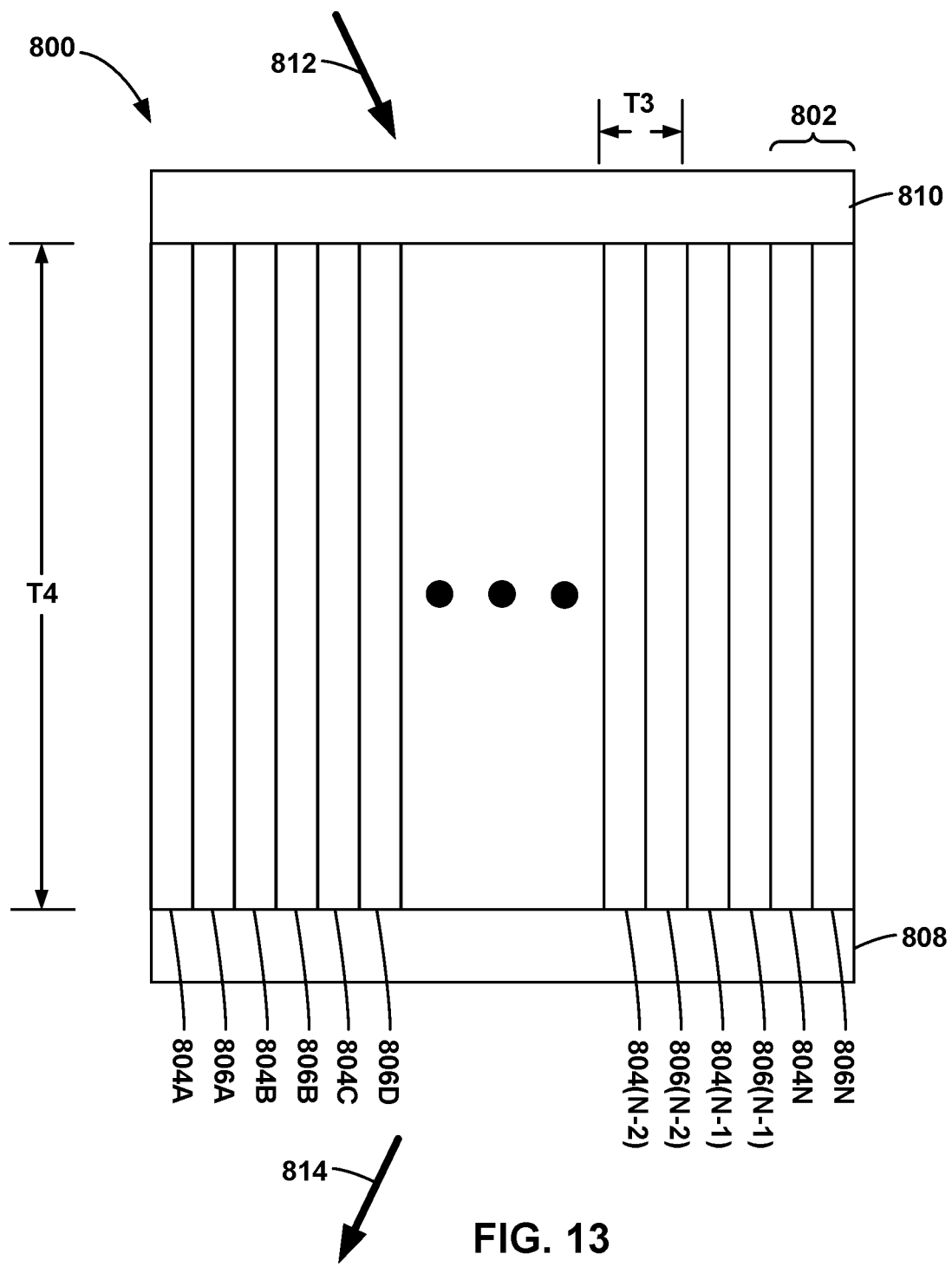
FIG. 13 is a conceptual diagram illustrating an example transmissive Bragg grating.

FIG. 13 is a conceptual diagram illustrating an example transmissive Bragg grating 800, which may, in some examples, be utilized for any of gratings 530, 534. In the example of FIG. 13, transmissive Bragg grating 800 includes a plurality of layer pairs 802. A layer pair of layer pairs 802 includes a first layer (e.g., first layer 804A) of a first material and a second layer (e.g., second layer 806A) of a second material. In some examples, such as shown in FIG. 13, each layer pair of the plurality of layer pairs 802 is substantially similar in composition and thickness (e.g., the same within manufacturing limitations). For example, each layer pair of the plurality of layer pairs 802 may include a respective first layer 804A-804N (collectively, "first layers 804") and a respective second layer 806A-806N (collectively, "second layers 806"). In other examples, at least one of the layer pairs includes a property different than another one of the layer pairs (e.g., layer composition, thickness, or the like).

The first material of first layers 804 exhibits a first refractive index. The second material of second layers 806 exhibits a second refractive index. The first and second refractive indices are different, and may be different by at least about 0.1, or at least about 0.2, or at least about 0.25, or about 0.3. For example, the first material of first layers 804 may exhibit a first refractive index of about 1.5 and the second material of second layers 806 may exhibit a second refractive index of about 1.8 (for a difference of about 0.3). Each of first layers 804 and second layers 806 may include any suitable material, such as a polymer, a glass, or the like. For example, each of first layers 804 may include a first polymer and each of second layers 806 may include a second polymer. In this way, transmissive Bragg grating 800 includes a plurality of interfaces between materials having dissimilar refractive indices, at which reflection and/or refraction can occur.

Each of first layers 804 and second layers 806 may have a selected thickness. In some examples, the thicknesses of a first layer 804 and a second layer 806 in a layer pair is substantially the same (e.g., the same within manufacturing tolerances). In other examples, within a layer pair, the thickness of a first layer 804 may be different from a thickness of a second layer 806. A thickness, T3, of a layer pair may be referred to as a Bragg pitch. In some examples, the Bragg pitch, T3, may be between about 800 nm and about 900 nm, such as between about 800 nm and about 825 nm or between about 875 nm and 900 nm.

Similarly, in some examples, each of first layers 804 may have substantially the same thickness (e.g., the same within manufacturing tolerances). In some examples, each of second layers 806 may have substantially the same thickness (e.g., the same within manufacturing tolerances). In other examples, at least one of first layers 804 may have a different thickness than another of first layers 804 and/or at least one of second layers 806 may have a different thickness than another of second layers 806.

The thicknesses of first layers 804 and second layers 806 may be selected based upon desired wavelengths for transmissive Bragg grating 800 to diffract incident light. In some examples, the thicknesses may be on the order of hundreds of nanometers.

Transmissive Bragg grating 800 may include any suitable number of layer pairs 802. In some examples, transmissive Bragg grating 800 may include at least ten layer pairs 802, such as tens or hundreds of layer pairs 802.

Transmissive Bragg grating 800 also includes a bottom substrate 808 and a top substrate 810. Bottom substrate 808 and top substrate 810 may be configured to provide structural support for transmissive Bragg grating 800. Bottom substrate 808 and top substrate 810 may include any material substantially transparent to wavelengths of light 508 output by projector 502 to be incident on transmissive Bragg grating 800. In some examples, bottom substrate 808 and top substrate 810 may include a glass, a polymer, or the like. In some implementations, one or both of bottom substrate 808 and top substrate 810 may be omitted and, for example, transmissive Bragg grating 800 may be formed directly on waveguide (e.g., waveguide 512).

In the example of FIG. 13, major surfaces (or major planes) of layers 804 and 806 are substantially perpendicular to the major planes of bottom substrate 808 and top substrate 810. The major surfaces (or major planes) of layers 804 and 806 also may be substantially perpendicular to a major surface of the waveguide 512 into which or out of which transmissive Bragg grating 800 is configured to couple light.

By properly selecting the first and second refractive indices and thicknesses of the first and second layers 804 and 806, transmissive Bragg grating 800 may exhibit similar diffractive efficiencies and/or diffraction angles for a plurality of selected wavelengths of light 508. For example, a diffractive efficiency and/or diffraction angle of a selected diffraction order for a first wavelength of light 508A may be similar to a diffractive efficiency and/or diffraction angle of a selected diffraction order for a second wavelength of light 508B and/or may be similar to a diffractive efficiency and/or diffraction angle of a selected diffraction order for a third wavelength of light 508C. The selected diffraction order may be different for the first and second (and third) wavelengths of light 508A, 508B, and 508C.

Transmissive Bragg grating 800 may have a thickness, T4, selected to accomplish a desired redirection of incident light 812 to output light 814. For example, transmissive Bragg grating may have a thickness between about 5 micrometers and about 20 micrometers, such as about 8 micrometers.

To select the properties for constructing transmissive Bragg grating 800, the equation $2*n_{ave}*pitch*\cos(\alpha)=m*\lambda$, wherein $n_{ave}$ is the average refractive index of the layer pairs 802 $((n_1+n_2)/2)$; pitch is the Bragg pitch, T1, $\alpha$ is the incidence angle of light 508, m is the diffraction order, and $\lambda$ is the wavelength of light, may be solved for integer values of m in combination with selected values of $n_{ave}$, pitch, $\alpha$, and $\lambda$ to determine which wavelengths will diffract for a given transmissive Bragg grating 800 (i.e., a transmissive Bragg grating 800 with a selected composition and geometry of layers 804 and 806). When integer values of m satisfy this equation for desired wavelengths of light, diffraction efficiency of transmissive Bragg grating 800 for each of the desired wavelengths may be determined, for example, using a simulation program such as COMSOL Multiphysics® modeling software, available from COMSOL, Inc., Burlington, Mass.; or LCDMaster 3D, available from SHINTECH, INC., Houston, Tex. The resulting transmissive Bragg grating 800 may exhibit substantially similar diffractive efficiencies for the desired wavelengths of light. As used herein, in some examples, "substantially similar diffractive efficiencies" means within about 10%, in some examples, within about 5%, or in some examples, within 2% diffractive efficiency.

For example, transmissive Bragg grating 800 may include the following properties: first refractive index of first layers 804: 1.5; second refractive index of second layers 806: 1.8; Bragg pitch, T3: 897 nm; total thickness, T4: about 8 micrometers; incidence angle: about 65 degrees. Such a transmissive Bragg grating 800 may exhibit substantially similar diffractive efficiencies and diffraction angles for light of about 447 nm, about 536 nm, and about 670 nm, and the diffractive efficiency may be greater than about 0.90 (90%) for each of the three wavelengths.

Figure 14:
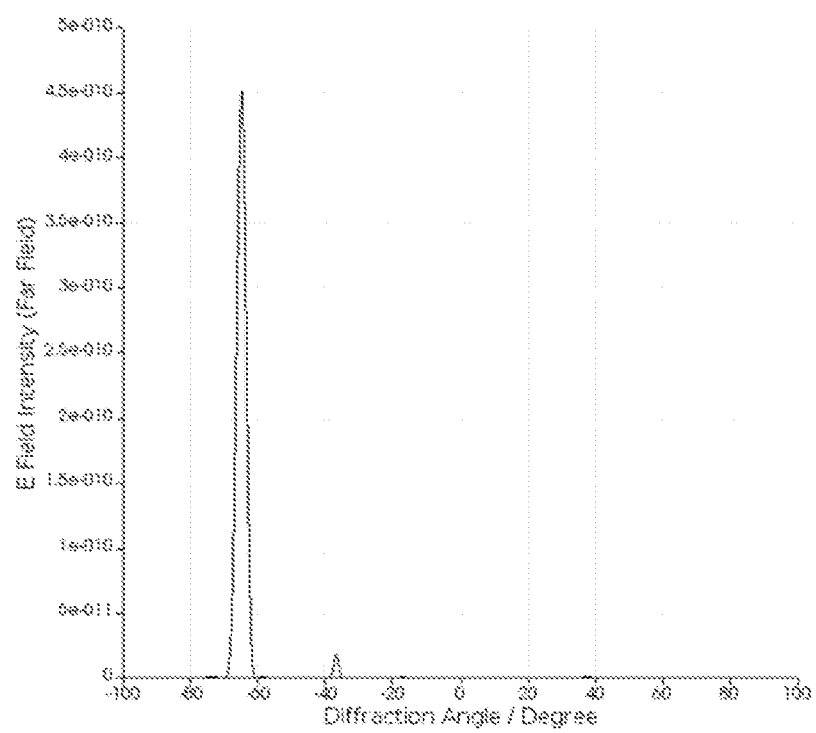
FIGS. 14-16 are plots of simulated electromagnetic field intensity versus diffraction angle for an example transmissive Bragg grating.
Figure 15:
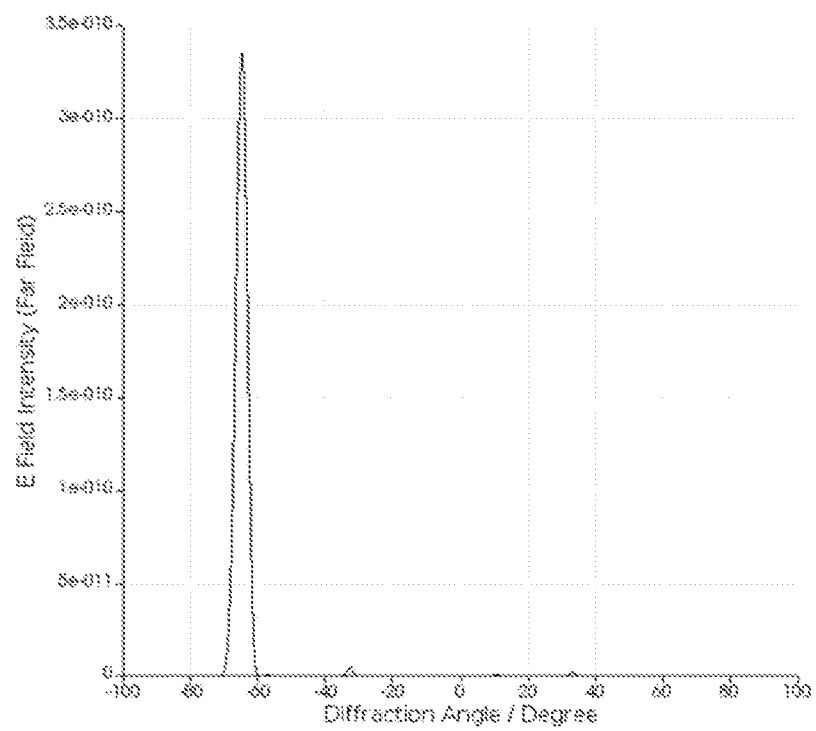
Figure 16:
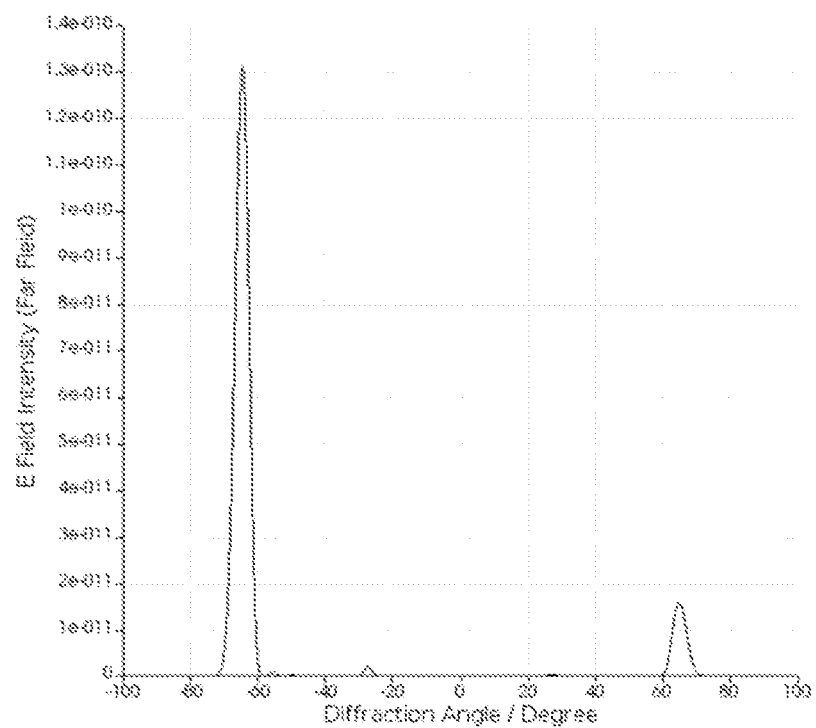

FIG. 14 is a plot of simulated electromagnetic field intensity versus diffraction angle for an example transmissive Bragg grating (like that shown in FIG. 13) and light with a wavelength of 447 nm. The $6^{th}$ order diffractive efficiency was about 98.6%. FIG. 15 is a plot of simulated electromagnetic field intensity versus diffraction angle for an example transmissive Bragg grating (like that shown in FIG. 13) and light with a wavelength of 536 nm. The $5^{th}$ order diffractive efficiency was about 99.6%. FIG. 16 is a plot of simulated electromagnetic field intensity versus diffraction angle for an example transmissive Bragg grating (like that shown in FIG. 13) and light with a wavelength of 670 nm. The $4^{th}$ order diffractive efficiency was about 91.5%. Further, as shown in FIGS. 14-16, the diffraction angles are substantially similar for the light of 447 nm, 536 nm, and 670 nm.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs or videos). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:
1. An optical assembly comprising:
   a waveguide; and a Bragg grating configured to couple light into or out of the waveguide, wherein the Bragg grating comprises a plurality of layer pairs, wherein at least one layer pair comprises a first material having a first refractive index and a second layer having a second refractive index, wherein properties of the Bragg grating are selected so that the Bragg grating exhibits a substantially similar diffractive efficiency and a substantially the same diffraction angle for light of at least two colors, wherein the properties of the Bragg grating are selected so that the Bragg grating exhibits a substantially similar diffractive efficiency for light of three colors, wherein each layer pair of the plurality of layer pairs comprises the first material and the second material, and wherein a thickness of each layer pair of the plurality of layer pairs is substantially the same.

2. The optical assembly of claim 1, wherein the Bragg grating comprises a reflective Bragg grating.

3. The optical assembly of claim 1, wherein the Bragg grating comprises a transmissive Bragg grating.

4. The optical assembly of claim 1, wherein the properties of the Bragg grating are selected so that the Bragg grating exhibits a substantially similar diffractive efficiency for first light having a first wavelength and second light having a second wavelength, wherein the first wavelength is different from the second wavelength by at least about 50 nm.

5. The optical assembly of claim 1, wherein the light of three colors comprises light having a wavelength of between about 430 nm and about 450 nm, light having a wavelength of between about 525 nm and about 550 nm, and light having a wavelength of between about 650 nm and about 675 nm.

6. The optical assembly of claim 1, wherein the Bragg grating exhibits substantially similar diffractive efficiency for light of at least two colors, for a diffraction order of the first light that is different than a diffraction order of the second light.

7. The optical assembly of claim 1, wherein the properties comprise at least one of the first refractive index, the second refractive index, an average of the first refractive index and the second refractive index, or a thickness of each layer pair of the plurality of layer pairs.

8. The optical assembly of claim 1, wherein the plurality of layer pairs defines a major plane, wherein the waveguide defines a major plane, and wherein the major plane of the plurality of layer pairs is oriented at a non-parallel and non-perpendicular angle to the major plane of the waveguide.

9. The optical assembly of claim 1, wherein the Bragg grating is an input coupling grating.

10. The optical assembly of claim 1, wherein the Bragg grating is an output coupling grating.

11. The optical assembly of claim 1, wherein the Bragg grating is an input coupling grating, further comprising an output coupling grating, wherein the output coupling grating comprises:
a second plurality of layer pairs, wherein a second layer pair of the second plurality of layer pairs comprises a third material having a third refractive index and a fourth layer having a fourth refractive index, and wherein properties of the output coupling grating are selected so that the output coupling grating exhibits a substantially similar diffractive efficiency and a substantially the same diffraction angle for light of at least two colors.

12. The optical assembly of claim 1, further comprising a projector configured to direct light into the waveguide via the Bragg grating.

13. A head mounted display comprising:
a projector; and
an optical assembly comprising:
a waveguide; and
a Bragg grating configured to couple light into or out of the waveguide, wherein the Bragg grating comprises a plurality of layer pairs, wherein a layer pair comprises a first material having a first refractive index and a second layer having a second refractive index, wherein properties of the Bragg grating are selected so that the Bragg grating exhibits a substantially similar diffractive efficiency and a substantially the same diffraction angle for light of at least two colors, wherein the properties of the Bragg grating are selected so that the Bragg grating exhibits a substantially similar diffractive efficiency for light of three colors, wherein each layer pair of the plurality of layer pairs comprises the first material and the second material, and wherein a thickness of each layer pair of the plurality of layer pairs is substantially the same, and wherein the projector is configured to direct light into the waveguide.

14. The head mounted display of claim 13, wherein the properties of the Bragg grating are selected so that the Bragg grating exhibits a substantially similar diffractive efficiency for light having a wavelength of between about 430 nm and about 450 nm, light having a wavelength of between about 525 nm and about 550 nm, and light having a wavelength of between about 650 nm and about 675 nm.

15. The head mounted display of claim 13, wherein the properties comprise at least one of the first refractive index, the second refractive index, an average of the first refractive index and the second refractive index, or a thickness of each layer pair of the plurality of layer pairs.

16. The head mounted display of claim 13, wherein the plurality of layer pairs defines a major plane, wherein the waveguide defines a major plane, and wherein the major plane of the layer pair is oriented at a non-parallel and non-perpendicular angle to the major plane of the waveguide.

17. The head mounted display of claim 13, wherein the Bragg grating is an input coupling grating, further comprising an output coupling grating, wherein the output coupling grating comprises:
a second plurality of layer pairs, wherein a second layer pair of the second plurality of layer pairs comprises a third material having a third refractive index and a fourth layer having a fourth refractive index, and wherein properties of the output coupling grating are selected so that the output coupling grating exhibits a substantially similar diffractive efficiency for light of at least two colors.

18. A method comprising:
determining properties of a Bragg grating so that the Bragg grating exhibits a substantially similar diffractive efficiency and a substantially the same diffraction angle for light of at least two colors, wherein the properties of the Bragg grating are determined so that the Bragg grating exhibits a substantially similar diffractive efficiency for light of three colors, wherein the Bragg grating is configured to couple light into or out of a waveguide, wherein the Bragg grating comprises a plurality of layer pairs, wherein at least one layer pair comprises a first material having a first refractive index and a second layer having a second refractive index, wherein each layer pair of the plurality of layer pairs comprises the first material and the second material, and wherein a thickness of each layer pair of the plurality of layer pairs is substantially the same; and assembling the Bragg grating with a waveguide.

* * * * *